US011560504B2

(12) United States Patent
Odukomaiya et al.

(10) Patent No.: US 11,560,504 B2
(45) Date of Patent: Jan. 24, 2023

(54) SALT HYDRATE-BASED PHASE CHANGE THERMAL ENERGY STORAGE AND ENCAPSULATION THEREOF

(71) Applicant: Alliance for Sustainable Energy, LLC, Golden, CO (US)

(72) Inventors: Adewale Odukomaiya, Denver, CO (US); Erin Lynn Blackley, Colorado Springs, CO (US); Jason David Woods, Boulder, CO (US); Judith Cecilia Vidal, Littleton, CO (US); Shuang Cui, Denver, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 29 days.

(21) Appl. No.: 17/337,757

(22) Filed: Jun. 3, 2021

(65) Prior Publication Data

US 2021/0380861 A1 Dec. 9, 2021

Related U.S. Application Data

(60) Provisional application No. 63/033,878, filed on Jun. 3, 2020.

(51) Int. Cl.
*C09K 5/06* (2006.01)

(52) U.S. Cl.
CPC .................................. *C09K 5/063* (2013.01)

(58) Field of Classification Search
CPC ............................................. C09K 5/063
USPC ...................................... 428/307.7
See application file for complete search history.

(56) References Cited

U.S. PATENT DOCUMENTS

| | | | |
|---|---|---|---|
| 3,404,061 | A | 10/1968 | Shane et al. |
| 4,189,394 | A | 2/1980 | Schroder et al. |
| 7,235,301 | B2 | 6/2007 | Bacher et al. |
| 7,923,112 | B2 | 4/2011 | Christ et al. |
| 8,045,846 | B2 | 10/2011 | Amano |
| 8,070,876 | B1 | 12/2011 | Jiang |
| 9,328,440 | B2 * | 5/2016 | Allen, Jr. ............... C08L 23/12 |
| 9,447,995 | B2 | 9/2016 | Bloedow et al. |
| 10,093,843 | B2 | 10/2018 | Eliyahu et al. |
| 2010/0116457 | A1 | 5/2010 | Öttinger et al. |
| 2013/0264023 | A1 | 10/2013 | Hudler et al. |
| 2022/0243998 | A1 * | 8/2022 | Odukomaiya ........ F28D 20/023 |

FOREIGN PATENT DOCUMENTS

| | | | | |
|---|---|---|---|---|
| CN | 105860143 | A * | 8/2016 | ............... C08J 5/18 |
| CN | 106967390 | A * | 7/2017 | |
| CN | 107446434 | A * | 12/2017 | ........... C09D 131/04 |
| EP | 0 074 612 | B1 | 1/1986 | |
| EP | 3 058 045 | B1 | 9/2019 | |
| WO | WO-2013077379 | A1 * | 5/2013 | ............. C09K 5/063 |

OTHER PUBLICATIONS

Duan et al., "CaCl2 • 6H2O/Expanded graphite composite as form-stable phase change materials for thermal energy storage", Journal of Thermal Analysis and Calorimetry, 2014, vol. 115, pp. 111-117.
Feilchenfeld et al., "Calcium Chloride Hexahydrate: A Phase-Changing Material for Energy Storage", Industrial & Engineering Chemistry Research, 1985, vol. 24, pp. 130-133.
Lane, "Phase change materials for energy storage nucleation to prevent supercooling", Solar Energy Materials and Solar Cells, 1992, vol. 27, pp. 135-160.
Li et al., "Phase change behavior of latent heat storage media based on calcium chloride hexahydrate composites containing strontium chloride hexahydrate and oxidation expandable graphite", Applied Thermal Engineering, 2016, vol. 102, pp. 38-44.
Liu et al., "Graphene oxide modified hydrate salt hydrogels: form-stable phase change materials for smart thermal management", Journal of Materials Chemistry A, 2016, vol. 4, 18134-18143.
Mills et al., "Thermal conductivity enhancement of phase change materials using a graphite matrix", Applied Thermal Engineering, 2006, vol. 26, pp. 1652-1661.
Rao et al., "A review on methods of preventing super cooling in phase change materials (PCMs)", 3rd International Conference on "Advancements in Aeromechanical Materials for Manufacturing", AIP Conference Proceedings 2317, Feb. 2021, pp. 020003-1-020003-13.
Sögütoglu et al., "Understanding the Hydration Process of Salts: The Impact of a Nucleation Barrier", Crystal Growth & Design, 2019, vol. 19, pp. 2279-2288.
Wang et al., "Experimental Study on Phase Change Thermal Storage of Crystalline Hydrated Salt Applied in Solar Thermal Utilization", Procedia Engineering, 2017, vol. 205, pp. 2259-2265.
Wu et al., "Hydrated salts/expanded graphite composite with high thermal conductivity as a shape-stabilized phase change material for thermal energy storage", Energy Conversion and Management, 2015, vol. 101, pp. 164-171.
Xie et al., "Inorganic Salt Hydrate for Thermal Energy Storage", Applied Sciences, 2017, vol. 7, No. 1317, pp. 1-18.
Zhou et al., "Hydrophilic Modification of Expanded Graphite to Prepare a High-Performance Composite Phase Change Block Containing a Hydrate Salt", Industrial & Engineering Chemistry Research, 2017, vol. 56, pp. 14799-14806.
Zhou et al., "Modification of expanded graphite and its adsorption for hydrated salt to prepare composite PCMs", Applied Thermal Engineering, 2018, vol. 133, pp. 446-451.
Zhang et al., "Hydrophilic expanded graphite magnesium nitrate-hexahydrate composite phase change materials: Understanding the effect of hydrophilic modification on thermophysical properties", International Journal of Energy Research, 2019, vol. 43, pags 1121-1132.

* cited by examiner

*Primary Examiner* — Douglas J McGinty
(74) *Attorney, Agent, or Firm* — Alexandra M. Hall

(57) ABSTRACT

Among other things, the present disclosure relates to phase change material (PCM) composites composed of an PCM mixed with a nucleating agent contained within the pores of a graphite matrix and/or a hydrogel. The process to create these PCM composites includes coating the surface of graphite with a surfactant, compressing the graphite to form a matrix, then filling the graphite matrix with the PCM.

16 Claims, 20 Drawing Sheets

A)

B)

C)

A)

B)

A)

B)

SALT HYDRATE-BASED PHASE CHANGE THERMAL ENERGY STORAGE AND ENCAPSULATION THEREOF

CROSS-REFERENCE TO RELATED APPLICATIONS

This application claims priority from U.S. Provisional Patent Application No. 63/033,878, filed on Jun. 3, 2020, the contents of which are incorporated herein by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

SUMMARY

An aspect of the present disclosure is a composition including a graphite matrix comprising an expanded graphite having a plurality of pores defining a pore volume, a surfactant having a first end and a second end, a mixture comprising a phase change material and a nucleating agent positioned within between about 40% and about 95% of the pore volume, in which the first end of the surfactant is bonded to the expanded graphite, the second end of the surfactant is bonded to the phase change material, the surfactant is present in a mass ratio of the surfactant to the expanded graphite between about 1:100 and about 5:100, and the nucleating agent is present in the mixture at a concentration between greater than zero weight percent (wt %) and less than about 6.0 wt %. In some embodiments, the pore volume is between about 60% and about 95% of a total volume of the graphite matrix as defined by the pore volume plus a volume of the expanded graphite present in the graphite matrix. In some embodiments, the surfactant includes at least one of octyl phenol ethoxylate ($C_{14}H_{22}O(C_2H_4O)_n$ where n=9-10) (TX-100) or polyethylene glycol tert-octylphenyl ether ($C_{14}H_{22}O(C_2H_4O)_n$ where n=7-8) (TX-105). In some embodiments, the mixture further comprises a hydrogel comprising at least one of poly(acrylamide-co-acrylic acid) (PAAAM), poly(acrylamide-co-sodium acrylate), or alginate. In some embodiments, the phase change material comprises a salt hydrate. In some embodiments, the salt hydrate includes at least one of calcium chloride hexahydrate ($CaCl_2 \cdot 6H_2O$), calcium bromide hexahydrate ($CaBr_2 \cdot 6H_2O$), disodium sulfate decahydrate ($Na_2SO_4 \cdot 10H_2O$), disodium phosphate dodecahydrate ($Na_2HPO_4 \cdot 12H_2O$), zinc nitrate hexahydrate ($Zn(NO_3)_2 \cdot 6H_2O$), magnesium chloride hexahydrate ($MgCl_2 \cdot 6H_2O$), magnesium nitrate hexahydrate ($Mg(NO_3)_2 \cdot 6H_2O$), or lithium nitrate trihydrate ($LiNO_3 \cdot 3H_2O$). In some embodiments, the nucleating agent includes at least one of strontium chloride hexahydrate ($SrCl_2 \cdot 6H_2O$), strontium bromide hexahydrate ($SrBr_2 \cdot 6H_2O$), strontium iodide hexahydrate ($SrI_2 \cdot 6H_2O$), barium iodide hexahydrate ($BaI_2 \cdot 6H_2O$), barium chloride hexahydrate ($BaCl_2 \cdot 6H_2O$), barium chloride ($BaCl_2$), barium carbonate ($BaCO_3$), strontium carbonate ($SrCO_3$), barium fluoride ($BaF_2$), strontium fluoride ($SrF_2$), barium hydrofluoride ($Ba(HF_2)$), barium oxide ($BaO$), barium hydroxide ($Ba(OH)_2$), barium sulfate ($BaSO_4$), or strontium hydroxide ($Sr(OH)_2$).

An aspect of the present disclosure is a method including, in order, heating an intercalated graphite to a temperature between about 200° C. and about 750° C. resulting in an expanded graphite, coating the expanded graphite with a surfactant having a first end and a second end to form a wetted graphite, compressing the wetted graphite to form a graphite matrix having a plurality of pores defining a pore volume, and filling between about 40% and about 95% of the pore volume with a mixture including a phase change material and a nucleating agent resulting in an energy storage material, in which the surfactant is present in a mass ratio of the surfactant to the expanded graphite between about 1:100 and about 5:100, the first end of the surfactant is bonded to the expanded graphite and the second end of the surfactant is bonded to the phase change material, and the nucleating agent is present in the mixture at a concentration between greater than zero wt % and less than about 6.0 wt %. In some embodiments, the pore volume is between about 60% and about 95% of a total volume of the graphite matrix as defined by the pore volume plus a volume of the expanded graphite present in the graphite matrix. In some embodiments, the heating includes placing the intercalated graphite in a furnace for a period of time in which the furnace is operated at a temperature of between about 200° C. and 750° C. In some embodiments, the period of time is between about one (1) minute and about ten (10) minutes. In some embodiments, the coating includes submerging the expanded graphite in a solution including the surfactant. In some embodiments, the surfactant includes at least one of octyl phenol ethoxylate ($C_{14}H_{22}O(C_2H_4O)_n$ where n=9-10) or polyethylene glycol tert-octylphenyl ether ($C_{14}H_{22}O(C_2H_4O)_n$ where n=7-8). In some embodiments, the compressing includes placing the wetted graphite in a hydraulic press having a pellet die, and pressing the pellet die on the wetted graphite resulting in the graphite matrix. In some embodiments, the filling includes melting the phase change material and the nucleating agent to form the mixture and submerging the graphite matrix in the mixture resulting in a slurry. In some embodiments, the filling also includes performing vacuum filtration on the slurry during the submerging, resulting in the energy storage material. In some embodiments, a hydrogel including at least one of poly (acrylamide-co-acrylic acid) (PAAAM), poly(acrylamide-co-sodium acrylate), or alginate is added to the mixture prior to the filling. In some embodiments, the phase change material includes a salt hydrate. In some embodiments, the salt hydrate includes at least one of calcium chloride hexahydrate ($CaCl_2 \cdot 6H_2O$), calcium bromide hexahydrate ($CaBr_2 \cdot 6H_2O$), disodium sulfate decahydrate ($Na_2SO_4 \cdot 10H_2O$), disodium phosphate dodecahydrate ($Na_2HPO_4 \cdot 12H_2O$), zinc nitrate hexahydrate ($Zn(NO_3)_2 \cdot 6H_2O$), magnesium chloride hexahydrate ($MgCl_2 \cdot 6H_2O$), magnesium nitrate hexahydrate ($Mg(NO_3)_2 \cdot 6H_2O$), or lithium nitrate trihydrate ($LiNO_3 \cdot 3H_2O$). In some embodiments, the nucleating agent includes at least one of strontium chloride hexahydrate ($SrCl_2 \cdot 6H_2O$), strontium bromide hexahydrate ($SrBr_2 \cdot 6H_2O$), strontium iodide hexahydrate ($SrI_2 \cdot 6H_2O$), barium iodide hexahydrate ($BaI_2 \cdot 6H_2O$), barium chloride hexahydrate ($BaCl_2 \cdot 6H_2O$), barium chloride ($BaCl_2$), barium carbonate ($BaCO_3$), strontium carbonate ($SrCO_3$), barium fluoride ($BaF_2$), strontium fluoride ($SrF_2$), barium hydrofluoride ($Ba(HF_2)$), barium oxide ($BaO$), barium hydroxide ($Ba(OH)_2$), barium sulfate ($BaSO_4$), or strontium hydroxide ($Sr(OH)_2$).

BACKGROUND

Thermal energy storage (TES) systems are technologies that promise to improve the energy efficiencies of systems such as in building envelopes, appliances, and heating, ventilation, and air conditioning (HVAC) systems. Phase change materials (PCMs) are of particular interest as TES systems for HVAC applications due to their high energy storage density and ability to store energy at constant (or near constant) temperature. Low temperature (between about 5° C. and about 50° C.) TES materials are of particular interest for buildings energy applications.

Hydrocarbon derived alkane paraffins are currently the most widely used PCMs for building applications, however, their widespread adoption in buildings has been hindered by their high cost, low volumetric energy capacities, and flammability. Inorganic PCMs show great promise due to their high volumetric energy density, abundance in nature and low cost. However, technical materials challenges facing with these materials include excessive supercooling (due to, for example, poor nucleation properties), incongruent melting/phase separation leading to short cycle life, and low thermal conductivity leading to slow charging/discharging. Thus, there remains a need for efficient latent heat TES systems for buildings, HVAC, and other applications.

BRIEF DESCRIPTION OF THE DRAWINGS

Some embodiments are illustrated in referenced figures of the drawings. It is intended that the embodiments and figures disclosed herein are to be considered illustrative rather than limiting.

DETAILED DESCRIPTION

Figure 1:
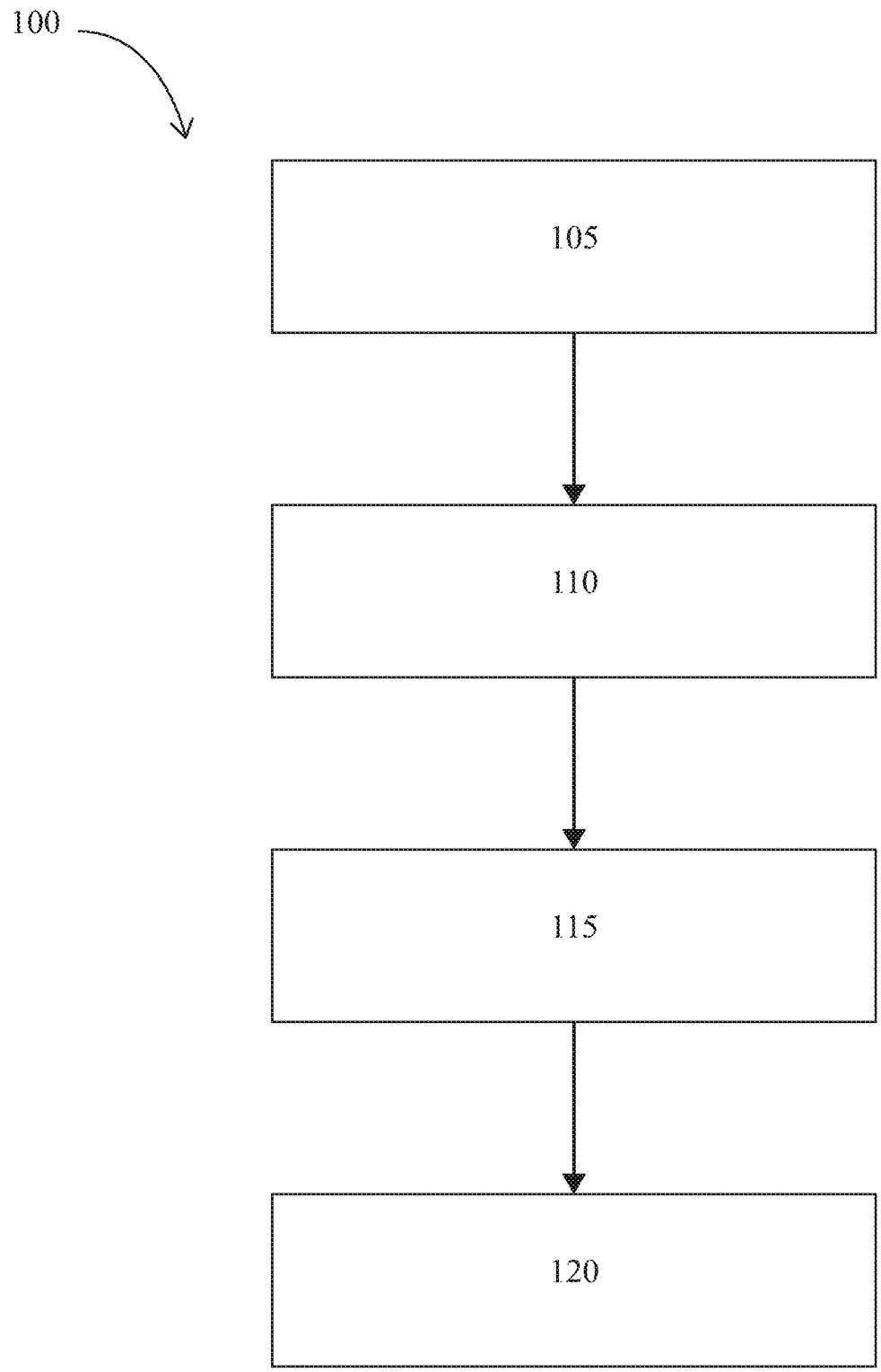
FIG. 1 illustrates a method of making a phase change material (PCM) composite, according to some aspects of the present disclosure.

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present disclosure, the term "substantially" is defined as approaching a specific numeric value or target to within 20%, 15%, 10%, 5%, or within 1% of the value or target. In further embodiments of the present disclosure, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present disclosure, the term "about" is used to indicate an uncertainty limit of less than or equal to ±20%, ±15%, ±10%, ±5%, or ±1% of a specific numeric value or target. In some embodiments of the present disclosure, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to phase change material (PCM) composites composed of a mixture that includes a PCM and a nucleating agent contained within a graphite matrix. As shown herein, in some embodiments of the present disclosure, a mixture may also include a hydrogel. The graphite matrix may be coated with a surfactant to connect the PCM to the graphite matrix. A process to create these PCM composites may include applying a surfactant to a surface of the graphite (e.g., internal surface of an internal pore) resulting in a wetted graphite, compressing the surfactant-coated graphite to form a graphite matrix (i.e., wetted graphite), then filling at least a portion of the pores of the graphite matrix volume with the PCM. This process may result in a greater percentage of the graphite matrix internal pore volume being filled with PCM compared to traditional PCM preparation methods. Additionally, the PCM may be mixed with a nucleating agent prior to filling the graphite matrix. The presence of a nucleating agent may prevent supercooling, which is desirable because supercooling reduces the energy storage capabilities of a PCM. A hydrogel may be used in conjunction with or in place of the graphite matrix to contain (or encapsulate) the PCM. These PCM composites may be used in various applications, including for in building thermal energy storage applications.

In some embodiments of the present disclosure, a PCM may be a salt hydrate. Graphite is hydrophobic and non-polar, while salt hydrates are hydrophilic and polar. To address this, some embodiments of the present disclosure include coating the surface of the graphite with a surfactant (i.e., a surface-active agent) before compressing the graphite where the compressing forms a matrix and substantially filling the pores of the matrix with PCM. Due to its hydrophobic end, the surfactant wets the surface of the internal pores and provides a hydrophilic end capable of hydrogen bonding to the PCM (e.g., salt hydrate). In this manner, the surfactant acts as a "bridge" between the hydrophobic graphite and the hydrophilic PCM. This may allow for the more successful impregnation (i.e., filling) of the porous graphite matrix with salt hydrates (i.e., encapsulation of the salt hydrate by the graphite matrix).

FIG. 1 illustrates an exemplary method 100 of making a PCM composite, according to some aspects of the present disclosure. The method 100 includes, in order, heating 105 a graphite to form pores in the graphite, coating 110 the graphite with a surfactant, compressing 115 the graphite to form a graphite matrix (a structure in which other materials may be embedded), and filling 120 the graphite matrix with a mixture of a PCM and a nucleating agent. The order of the method 100 is important, as coating 110 the graphite prior to compressing 115 the graphite enables a maximum amount of the internal surface area of the graphite to be coated with surfactant, which in turn maximizes the penetration of the PCM into the matrix during the filling 120 because the surfactant connects the PCM to the graphite (i.e., the "bridge" described above).

As described in more detail below, a method 100 for making a PCM composite for energy storage may begin with heating 105 intercalated graphite, such that the heating 105 dramatically changes the physical properties of the intercalated graphite. The resultant graphite, referred to herein as expanded graphite (EG) may have significantly higher surface area and pore volume that the intercalated graphite. Next, the expanded surface of the EG may be treated with a surfactant to creating a non-polar bond between the non-polar end of the surfactant and the EG. This leaves the polar end of the surfactant available for later bonding with the PCM. The compressing 115 compacts the EG to create a dense support structure (i.e., a graphite matrix) for the PCM, with surfactant bonded to parts of the EG which are internal to the structure. The filling 120 bonds the polar end of the surfactant to the PCM, encapsulating the PCM in the graphite matrix.

Figure 2:
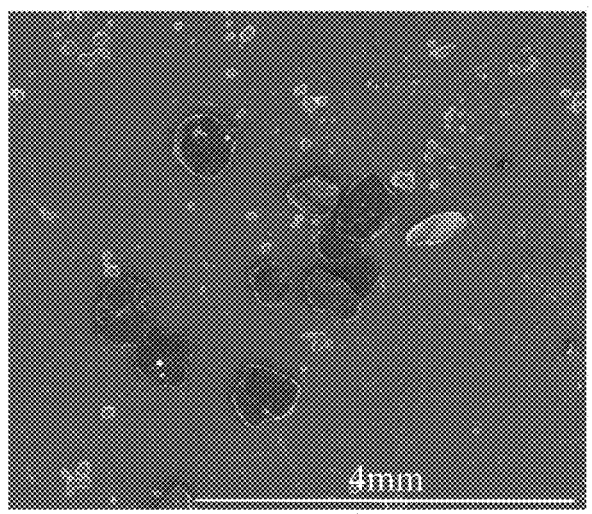
FIG. 2 illustrates scanning electron microscope (SEM) images of intercalated graphite flakes, according to some aspects of the present disclosure.
Figure 2:
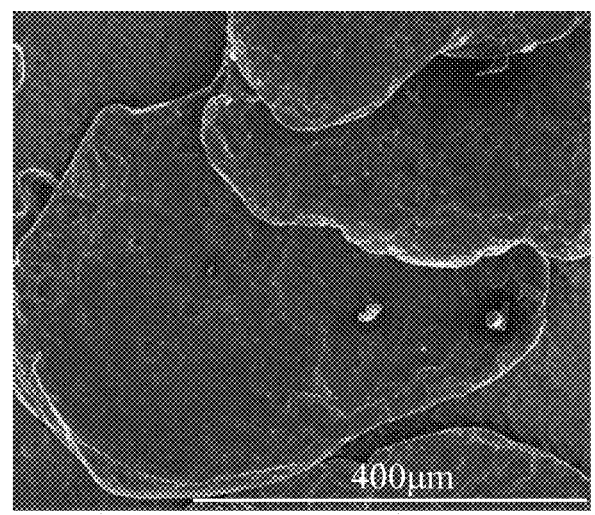
Figure 2:
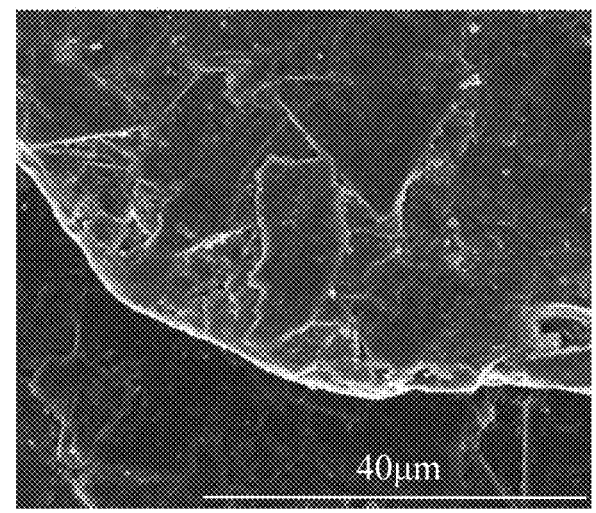
Figure 3:
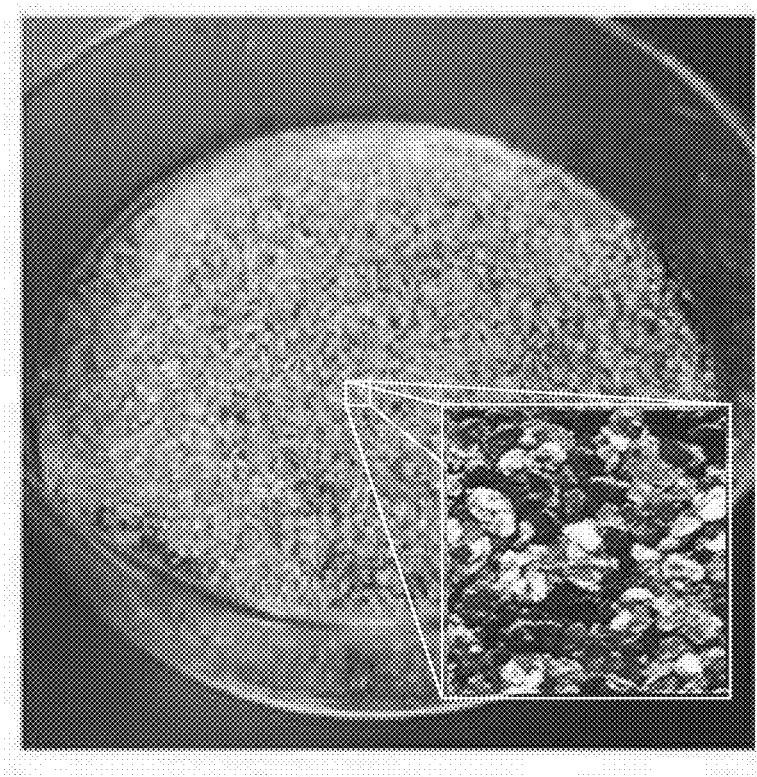
FIG. 3 illustrates intercalated graphite, according to some aspects of the present disclosure.
Figure 4:
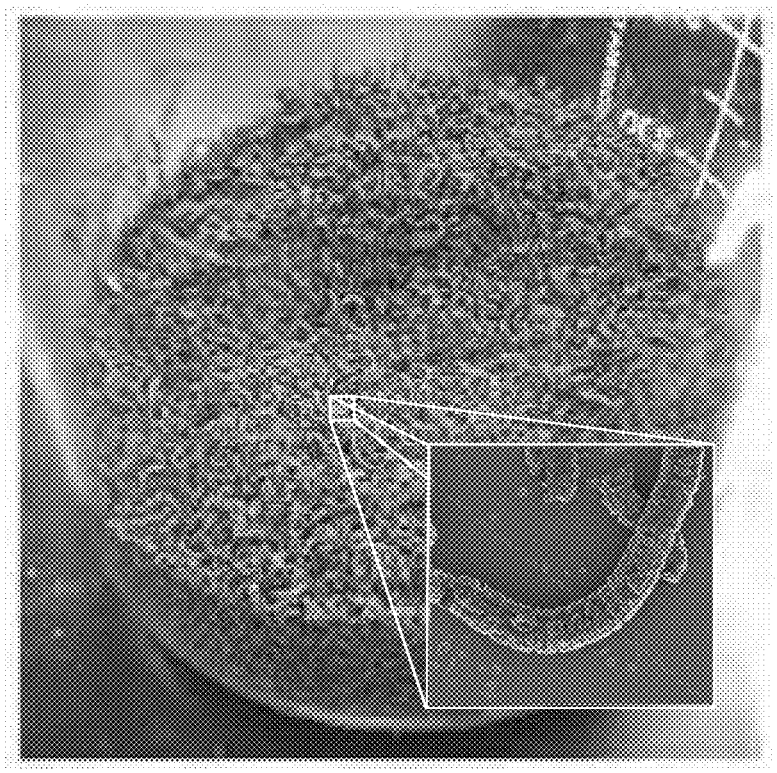
FIG. 4 illustrates expanded graphite (EG) after being heated, according to some aspects of the present disclosure.
Figure 5:
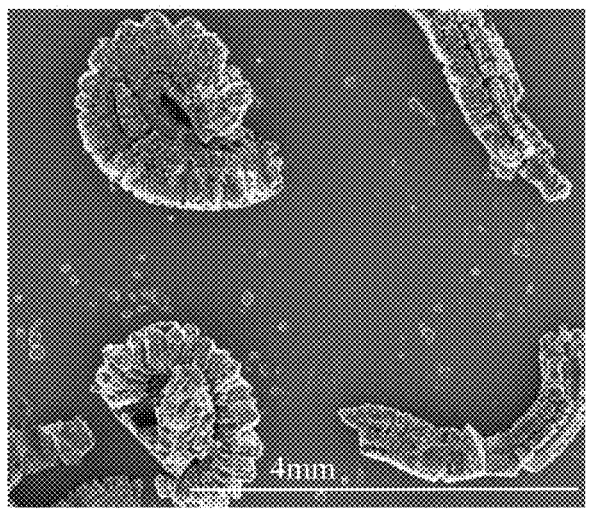
FIG. 5 illustrates SEM images of EG after being heated, according to some aspects of the present disclosure.
Figure 5:
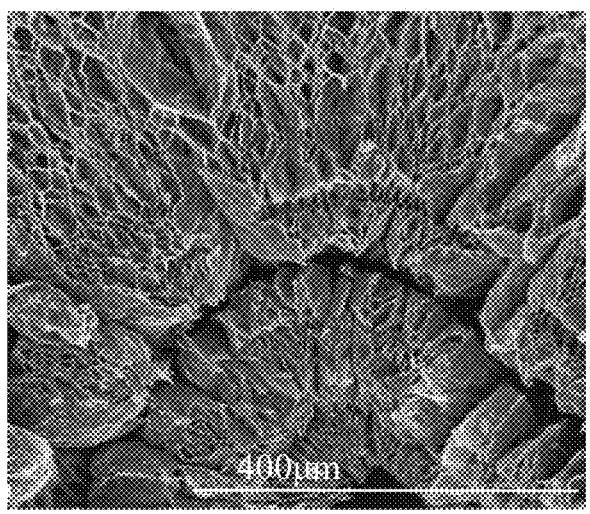
Figure 5:
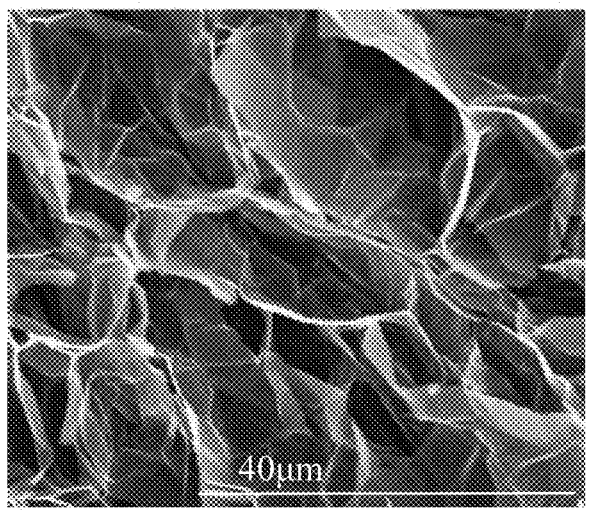

The exemplary method 100 first includes, heating 105 graphite to form pores which may later be filled 120 with PCM, which may also be referred to as expanding the graphite (because of the expansion of the layers of the graphite to form pores). The graphite may be intercalated graphite, which is formed from flake graphite and inserted molecules. Flake graphite consists of layers of carbon. The carbon is bonded with strong covalent bonds and the layers are bonded with weak van der Waals bonds. When weak acids are applied to flake graphite, these weak bonds can be overcome and molecules may be inserted (i.e., intercalated) between the layers. Examples of such acids include sulfuric acid, nitric acid, or chromic acid. FIG. 2 illustrates scanning electron microscope (SEM) images of intercalated graphite, according to some aspects of the present disclosure. Layers in the intercalated graphite may be seen in the highest magnification image, with the inserted molecules shown as white edges to the layers. The heating 105 may result in the intercalated graphite layers expanding and/or separating, forming pores or voids within the graphite. FIG. 3 illustrates intercalated graphite ready for heating 105, according to some aspects of the present disclosure. After heating 105 the graphite may be referred to as expanded graphite (EG) due to these pores formed by the separation of the layers. FIG. 4 shows EG after being rapidly heated 105, according to some aspects of the present disclosure. FIG. 5 illustrates SEM images of the EG after being heated 105, according to some aspects of the present disclosure. The EG may form cylindrical structures when it is heated 105.

Heating 105 may include placing the graphite in a furnace or oven or exposing it to a heating element for a period of time. The heating 105 may be performed at a temperature in the range between about 200° C. and about 750° C. A heating element may be an open flame, an induction stove top, or any other appropriate heating element. The period of time for heating 105 may be in the range between one (1) minute to ten (10) minutes. For example, in some embodiments, the period of time may be approximately five (5) minutes. The period of time may vary based on the volume of graphite to be heated 105 (e.g., a longer period of time may be required for a larger volume of graphite and a shorter period of time may be required for a smaller volume of graphite) and the time period may end when the graphite reaches the desired temperature or when the graphite expands to the desired porosity. Porosity is the ratio of the total volume of the pores of the graphite matrix to the total volume of the graphite matrix expressed as a percentage. The total volume available for filling by the PCM is approximately equal to the total volume of the pores (as the PCM can only fill the pores), meaning the total volume available for filling by the PCM must be less than or equal to the porosity.

The exemplary method 100 shown in FIG. 1 next includes coating 110 the surface of EG with a surfactant to facilitate better infiltration of the PCM into the graphite matrix during the filling 120. The surfactant may bond to the surface of the EG inside the pores formed during the heating 105. The coating 110 may be done by substantially submerging (or soaking) the EG in a solution containing a surfactant. After successful filling of the EG's pores with surfactant, the resultant EG may be dried in a furnace or oven or over a heating element at a relatively low temperature (for example, a temperature within the range of about 80° C. to about 150° C.) to remove any excess moisture. The amount of surfactant loaded in the wetted graphite may be characterized relative to the EG. The mass ratio of surfactant applied to the EG may be in the range of about 0.01 to about 0.05. For example, in some embodiments, the ratio of surfactant applied to EG may be approximately 0.05.

Figure 6:
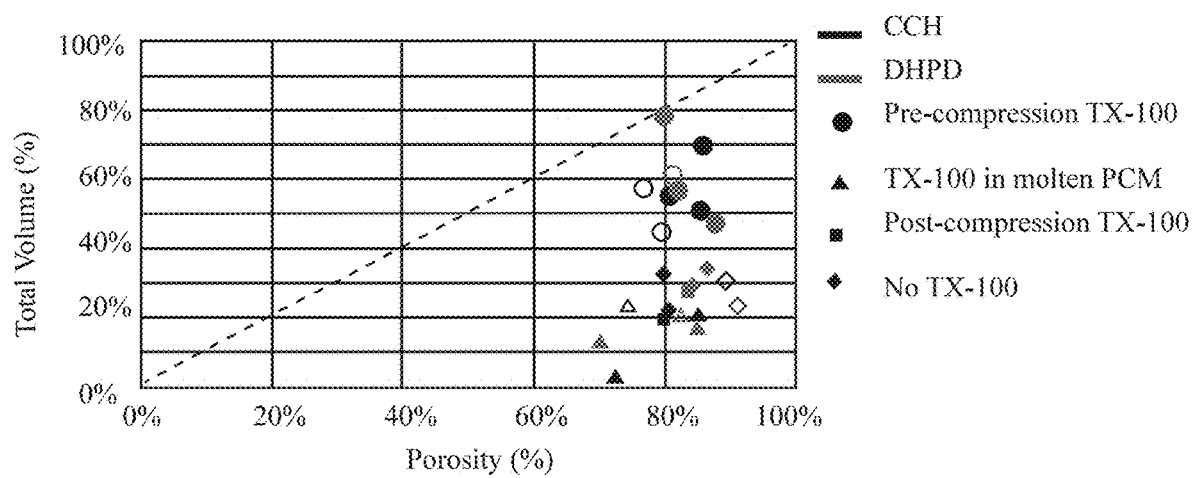
FIG. 6 illustrates the percent total volume of the graphite matrix filled with a PCM compared to the porosity of graphite matrix, according to some aspects of the present disclosure.

FIG. 6 illustrates the percent total volume of the graphite matrix filled with a PCM compared to the porosity of graphite matrix, according to some aspects of the present disclosure. Filled in points were filled 120 using soaking or submerging, outlined points were filled 120 using vacuum filtration. The dashed line is representative of the maximum saturation limit for a given porosity (for example, a graphite matrix of 50% porosity can only be filled by PCM to 50% of its total volume because only 50% of its total volume is open for filling). Thus, points that have a smaller vertical distance to the dashed line directly above it showed better impregnation. Points are shown for two types of PCM: calcium chloride hexahydrate ($CaCl_2$).$6H_2O$) (CCH) and disodium phosphate dodecahydrate ($Na_2HPO_4$.$12H_2O$) (DHPD), and for 1) no surfactant used during the preparation of the PCM composite, 2) applying a surfactant of octyl phenol ethoxylate ($C_{14}H_{22}O(C_2H_4O)_n$ where n=9-10) (known commercially as TX-100) to surface of the graphite matrix after it is compressed, 3) mixing a surfactant of TX-100 with melted PCM, and 4) coating 110 the surface of the EG with a surfactant of TX-100 prior to compressing 115 it to form the graphite matrix. There is a clear delineation between samples coated 110 with a surfactant of TX-100 prior being compressed 115 and the other samples. The samples coated 110 with a surfactant prior to being compressed 115 are significantly closer to the dashed line (indicating more of the available volume filled with PCM) and show that PCM is present in between about 40% to about 80% of the total volume of graphite matrix. Potentially higher fill percentages could be possible with graphite matrices of higher porosity. Soaking and vacuum filtration yield similar results, indicating either may be used during filling 120.

Figure 7:
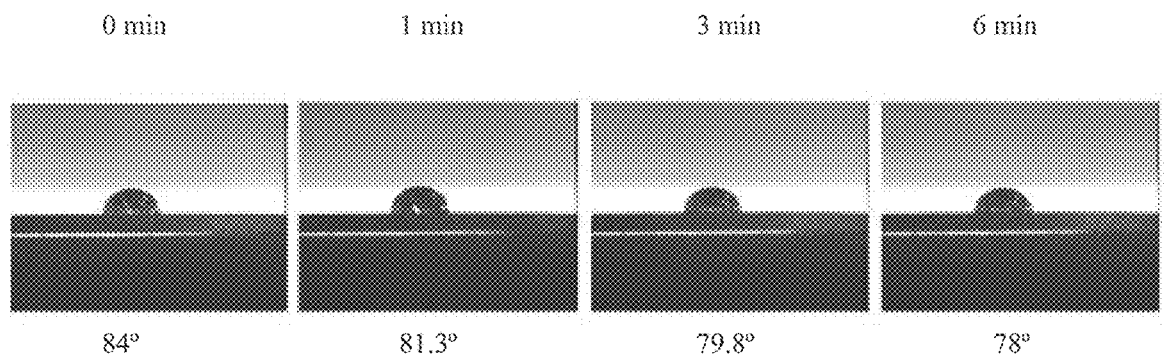
FIG. 7 illustrates contact angle measurements of a drop of PCM on the surface of a graphite matrix A) which had not been coated with surfactant, B) which was coated with surfactant after being compressed, and C) which had been coated with surfactant prior to being compressed, according to some aspects of the present disclosure.
Figure 7:
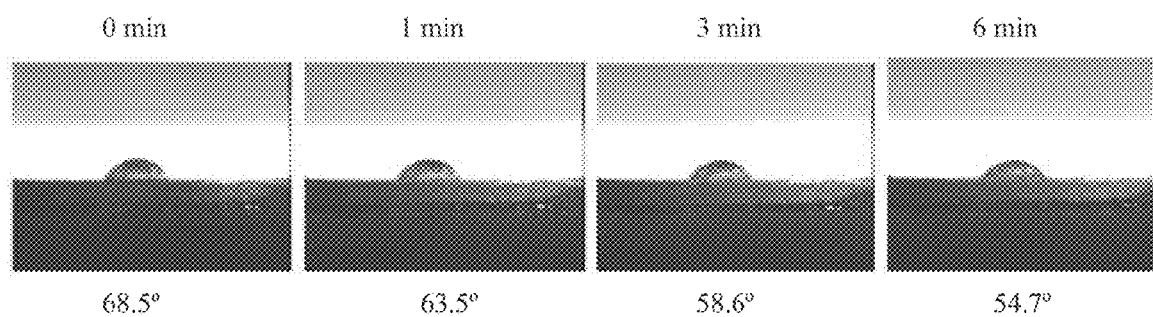
Figure 7:
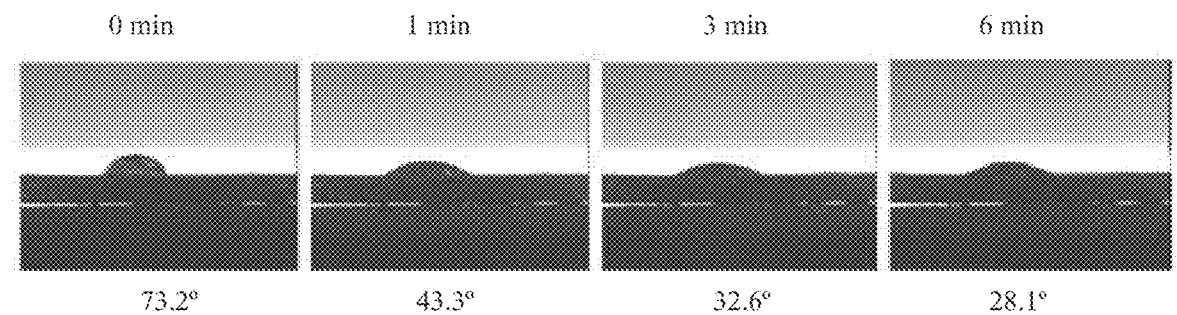
Figure 8:
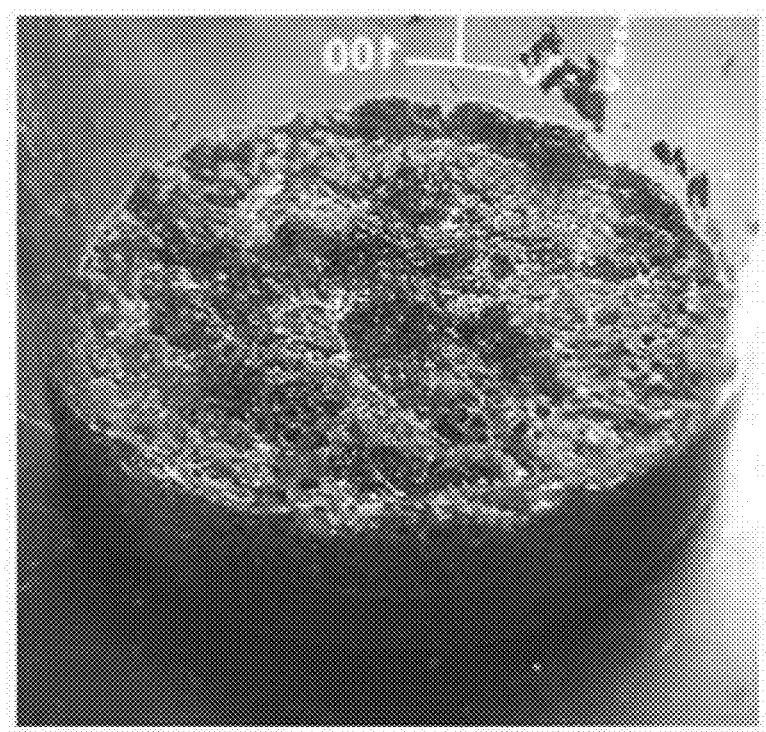
FIG. 8 illustrates EG being soaked in a solution containing a surfactant, according to some aspects of the present disclosure.

Coating 110 may decrease the wetting angle between the salt hydrate melt and the graphite surface, allowing the PCM to infiltrate the pores or voids of the EG more readily during the filling 120 (as shown in FIG. 7). The surfactant may be amphiphilic, having both a hydrophilic end and a hydrophobic end to form a "bridge" between the graphite and the PCM. In some embodiments, the surfactant maybe an anionic surfactant, a cationic surfactant, a nonionic surfactant, or an amphoteric (zwitterionic) surfactant. In some embodiments, the nonionic surfactant may be octyl phenol ethoxylate ($C_{14}H_{22}O(C_2H_4O)_n$ where n=9-10) (TX-100) and/or polyethylene glycol tert-octylphenyl ether ($C_{14}H_{22}O(C_2H_4O)_n$ where n=7-8) (TX-114). For example, FIG. 8 shows EG being submerged in a solution of TX-100, a nonionic surfactant, according to some aspects of the present disclosure.

FIG. 7 illustrates contact angle measurements of a drop of PCM (specifically CCH) on the surface of a graphite matrix A) which had not been coated with surfactant, B) which was coated with a surfactant of TX-100 after being compressed, and C) which had been coated with surfactant of TX-100 prior to being compressed, according to some aspects of the present disclosure. Contact angle measurements were taken at intervals of 1, 3, and 6 minutes after the PCM drop contacted the surface of the graphite matrix. As shown in C) coating 110 prior to compressing 115 resulted in a faster rate of diffusion of PCM (as shown by the faster decrease in contact angle). Despite having a higher initial contact angle, coating 110 prior to compressing 115 appears to be more effective at wetting more of the pores (i.e., preparing the pores for infiltration by PCM), including pores which ended up being in the inner part of the graphite matrix after compression. When the graphite matrix was compressed 115 prior to being coated 110 (as shown in B)), the surfactant appears to have "spread" across the top surface of the graphite matrix but did not infiltrate the inner pores of the graphite matrix.

As shown by FIGS. 6 and 7, by coating 110 prior to the compressing 115 the PCM is able to "attach" to more of the pores within the graphite matrix (via the surfactant). That is, by coating 110 the EG prior to compressing 115 the EG, the surfactant could wet most surfaces of the EG, including the pores or voids in the interior of the matrix after the compressing 115.

Figure 9:
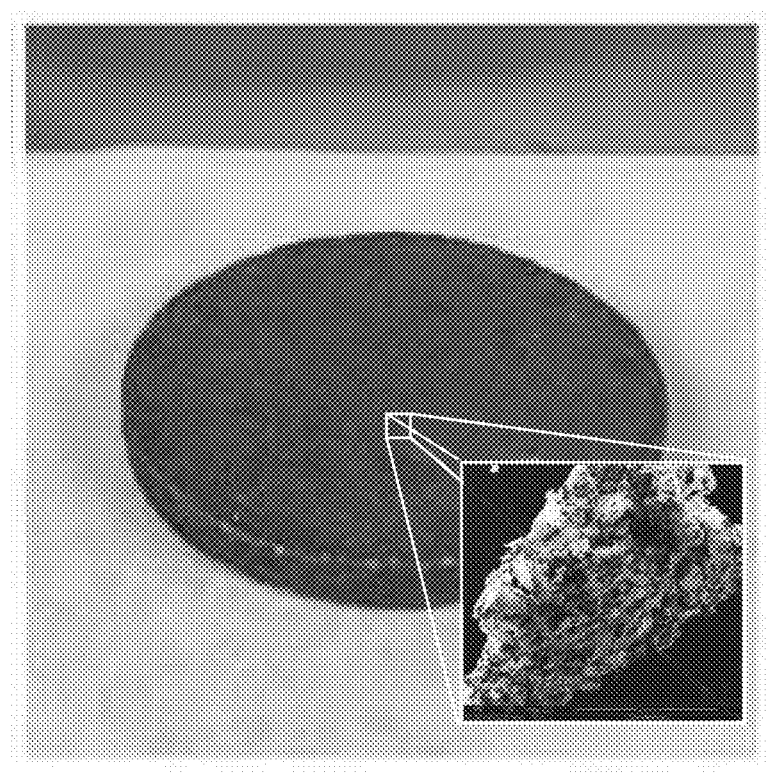
FIG. 9 illustrates a graphite matrix, formed by compressing EG which had been coated with surfactant, according to some aspects of the present disclosure.

The exemplary method 100 next includes compressing 115 the EG to form a graphite matrix. Compressing 115 increases the bulk density of the EG (mass divided by the volume occupied) while maintaining the pores. Compressing 115 allows the EG to form a strong support structure for the PCM. In some embodiments, the compressing 115 may be performed using a hydraulic press having a pellet die. The graphite matrix may be in the shape of a disc, a sphere, a brick, or may be substantially planar. The force necessary for the compressing 115 may be in the range of about 245 N to about 980 N. The final porosity of the graphite matrix may be in the range of about 60% to about 95%. FIG. 9 shows a compressed graphite matrix made of compressed EG coated in TX-100 in the shape of a disc, according to some aspects of the present disclosure. In the example of FIG. 9, the compressing 115 was performed using a 40 mm diameter (ID) pellet die.

The porosity ($\varphi$) of the matrix after the compressing 115 may be determined using the following equation:

$$\varphi = 1 - \frac{\rho_{EG}}{\rho_{ED}}$$

where $\rho_{EG}$ is the density of the EG and $\rho_{ED}$ is the effective density of the EG coated with surfactant (i.e., the EG after the coating 110). $\rho_{ED}$ may be determined using the following equation:

$$\rho_{ED} = \frac{m_{EG}}{m_{EG+S}} \cdot \rho_G + \frac{m_S}{m_{EG+S}} \cdot \rho_S$$

where $m_{EG}$ is the mass of the EG, $m_S$ is the mass of surfactant, $m_{EG+S}$ is the combined mass of the EG and the surfactant, $\rho_S$ is the density of the surfactant, and $\rho_G$ is the density of the EG, which may be assumed to be equivalent to the density of crystal graphite (approximately 2.09 g/cm$^3$). The compressing 115 may be performed at a compression force to achieve the desired porosity. The porosity may be in the range of about 0.6 (60%) to about 0.99 (99%). For example, for a matrix in the shape of a disc with a diameter of 40 mm, to achieve 65% porosity, the compressing 115 may require a force of approximately 1765 N. As another example, for a matrix in the shape of a disc with a diameter of 40 mm, to achieve 95% porosity, the compressing 115 may require a force of approximately 40 N.

Figure 10:
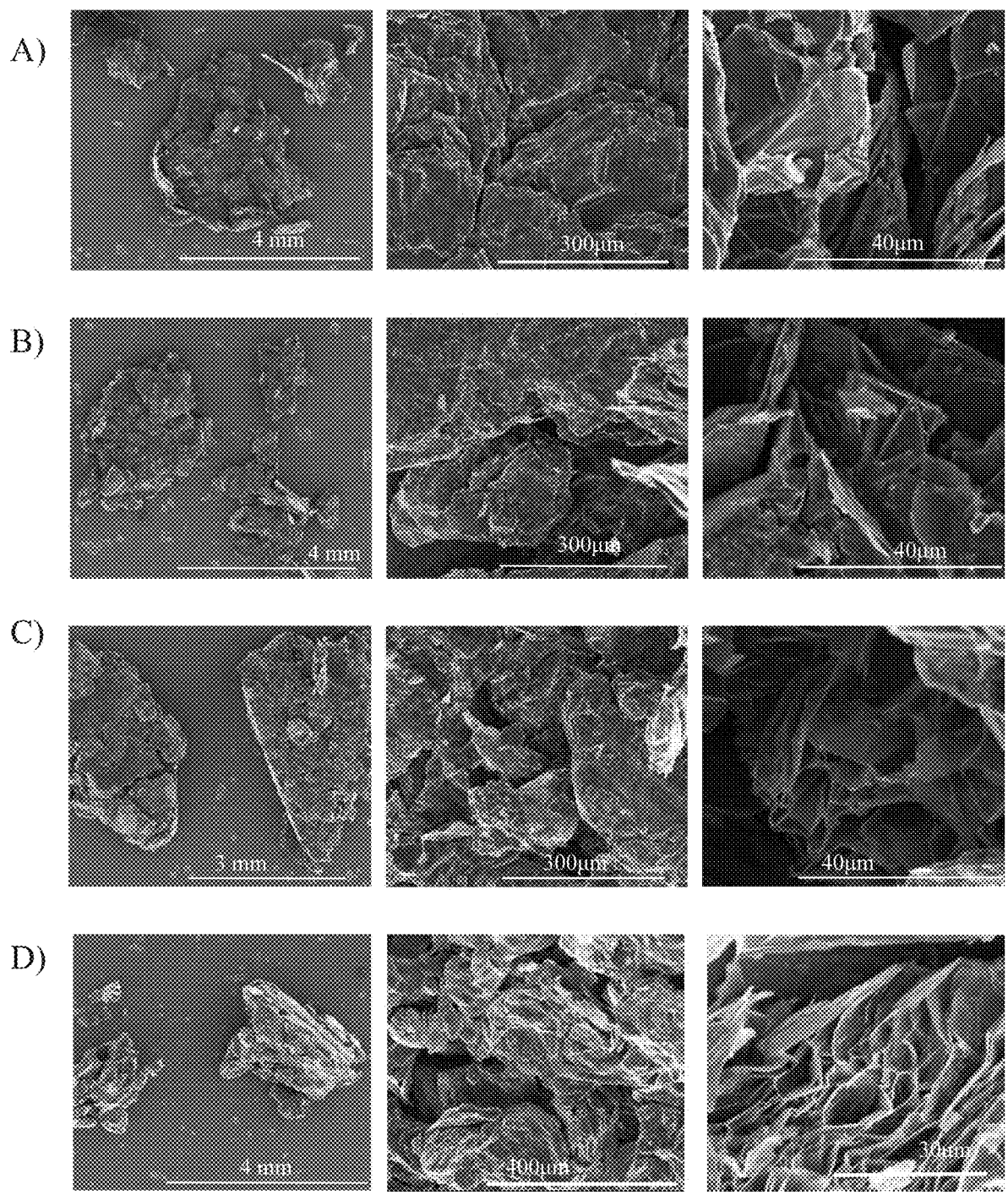
FIG. 10 illustrates SEM images of graphite matrices having A) 62% porosity, B) 73% porosity, C) 83% porosity, and D) 91% porosity, according to some aspects of the present disclosure.

FIG. 10 illustrates SEM images of graphite matrices (not having been coated in a surfactant) having A) 62% porosity, B) 73% porosity, C) 83% porosity, and D) 91% porosity, according to some aspects of the present disclosure. Notice that the pores become more evident as porosity increases. The pores having 91% porosity in D) resemble the non-compressed EG in FIG. 5, while the pores having 62% porosity in A) appear to have been "flattened," and resembles layers of intercalated graphite (as shown in FIG. 3) rather than a collection of pores.

Figure 11:
FIG. 11 illustrates graphite matrix coated in surfactant A) soaking in a mixture of PCM and nucleating agent, and B) undergoing vacuum soaking, according to some aspects of the present disclosure.
Figure 11:
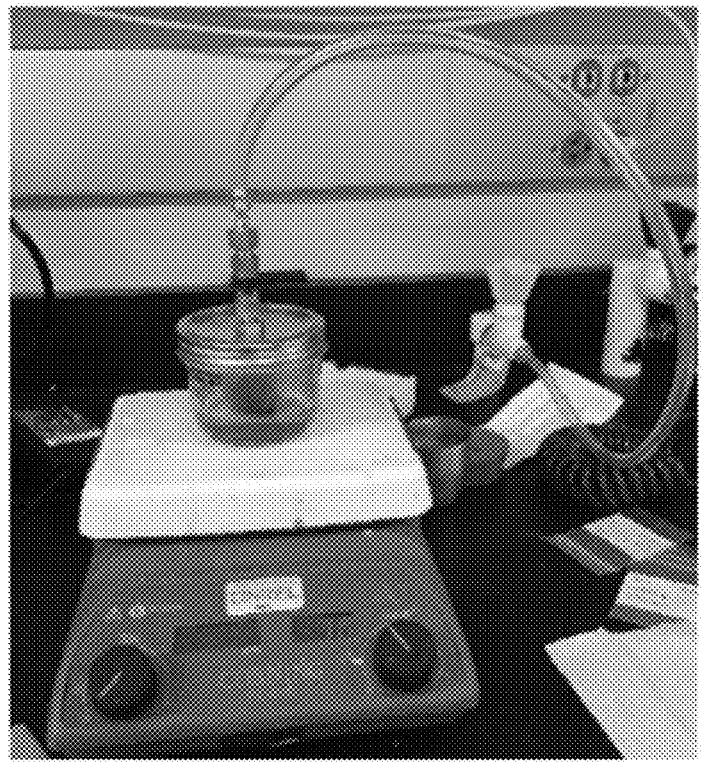
Figure 12:
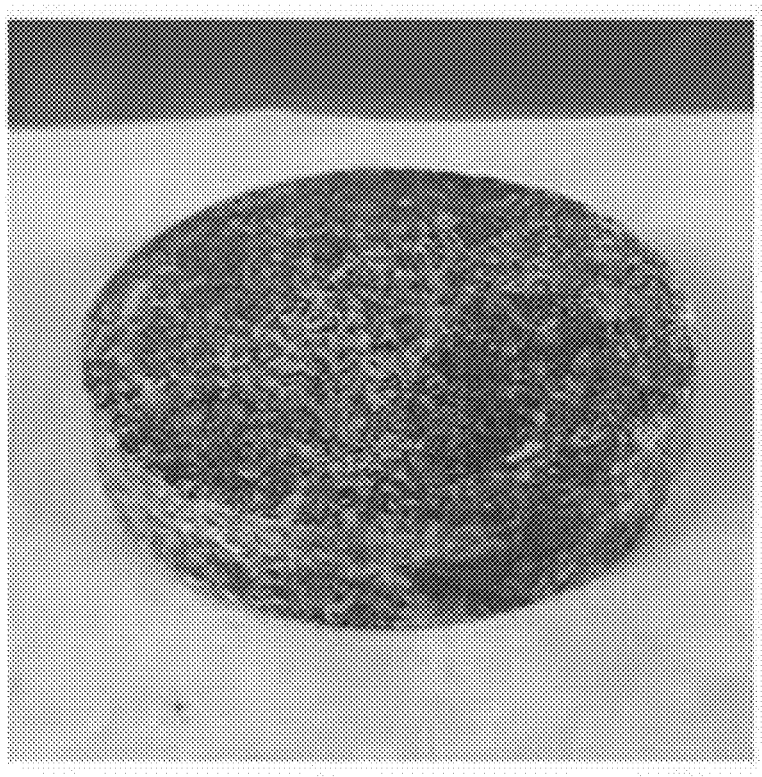
FIG. 12 illustrates a graphite matrix which is substantially filled with PCM, according to some aspects of the present disclosure.

The exemplary method 100 next includes filling 120 the graphite matrix with a mixture of a PCM and a nucleating agent. In some embodiments, the filling 120 may be done using soaking and/or vacuum filtration. For soaking, the filling 120 may include melting the PCM and the nucleating agent to form a mixture then submerging (or partially submerging) the graphite matrix in the mixture of melted PCM and melted nucleating agent. The submerging may be done while heating the mixture, keeping the PCM and nucleating agent melted during the submerging. For vacuum filtration, the filling 120 may include placing the mixture and the graphite matrix, melted PCM, and melted nucleating agent in a vacuum filtration system. In some embodiments, during the submerging the graphite matrix and mixture may be in a container which is connected to a vacuum, and any air in the container may be evacuated (i.e., vacuum soaking or vacuum filtration). The filling 120 may result in the PCM bonding with the surfactant to attach to the graphite matrix. The filling 120 may result in the PCM and nucleating agent at least partially filling the pores or voids in the matrix. FIG. 11 illustrates graphite matrix coated in surfactant A) soaking in a mixture of PCM and nucleating agent, and B) undergoing vacuum soaking, according to some aspects of the present disclosure. FIG. 12 illustrates a graphite matrix made of compressed EG coated TX-100 which has been substantially filled with a PCM of CCH, according to some aspects of the present disclosure.

In some embodiments, a hydrogel may be incorporated with the PCM and nucleating agent mixture during the filling 120. A hydrogel may extend the useful life of the PCM composite by preventing loss of water from the PCM composite during the hydration and dehydration of the PCM during usage. For example, when the PCM melts (i.e., dehydration of the PCM), the released water may be absorbed by the hydrogel and later released by the hydrogel to recombine in the PCM upon freezing/solidification (i.e., hydration of the PCM). In some embodiments, the hydrogel may be a hydrophilic polymer such as poly(acrylamide-co-acrylic acid) (PAAAM), poly(acrylamide-co-sodium acrylate) (PAASA), and/or alginate.

In some embodiments, a hydrogel may be used in place of the graphite matrix for the PCM composite providing substantially total encapsulation of the PCM and nucleating agent by the hydrogel. In some embodiments, the PCM/hydrogel encapsulation may be laced with thermally conductive fillers or encapsulated in a 3D printed thermally conductive polymer foam scaffold for enhancing the thermal conductivity. For example, ultrahigh molecular weight polyethylene (UHMWPE) could be used as a thermally conducting filler and/or three-dimensional (3D) printed thermally conductive polymer foams could be used as thermally conductive porous scaffolds. Encapsulation of the PCM by a hydrogel may eliminate phase separation, ensuring form-stability and long cycle-life, promote heterogeneous nucleation reducing supercooling, and may prevent leakage of liquid PCM. In some embodiments, the hydrogel encapsulated PCM composites may contain 5-10 weight percent (wt %) hydrogel, 2-3 wt % thermally conductive fillers/scaffolds, 2-3% nucleating agents, and 85-90 wt % salt hydrates.

In some embodiments, a hydrogel as encapsulation may be used to contain PCM using a core shell structure. This may eliminate the phase separation problem common in inorganic salt hydrates. The hydrogel may modulate the amount of water being released and absorbed by the PCM when undergoing a phase transition. The amount of water may be stored in the hydrogel and will be utilized when needed. The PCM may under an energetic transition release or absorb heat. PCM may be of great interest for thermal energy storage in building applications, where sub-cooling and phase separation often limit the use of PCMs. In some embodiments, using a hydrogel or other scaffolding may eliminate the phase separation and may address the sub-cooling by mixing nucleating agents with the PCM before filling a hydrogel. On the external wall of the hydrogel, a hydrophobic layer may be created to prevent the water from permeating out of the hydrogel.

Figure 13:
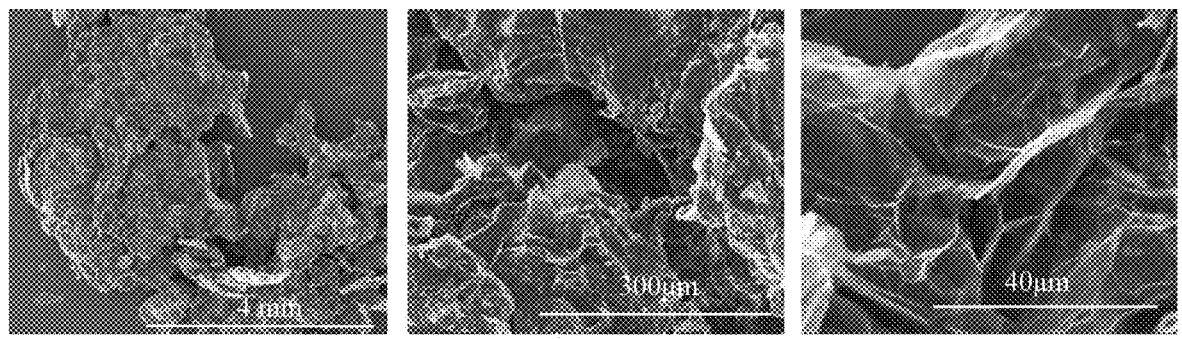
FIG. 13 illustrates SEM images of a graphite matrix coated with surfactant; A) coated with surfactant after being compressed and having a porosity of 84%, and B) coated with surfactant prior to being compressed and having a porosity of 83%, according to some aspects of the present disclosure.
Figure 13:
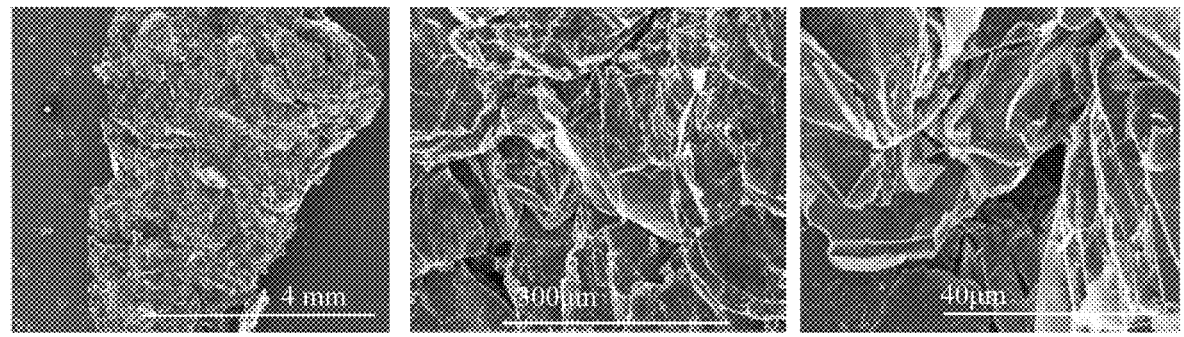

By coating 110 prior to the compressing 115, the methods described herein may result in greater infiltration of PCM into the graphite matrix. FIG. 13 illustrates SEM images of A) a graphite matrix coated with surfactant after being compressed and having a porosity of 84%, and B) a graphite matrix coated with surfactant prior to being compressed and having a porosity of 83%, according to some aspects of the present disclosure. In both A) and B), the visible edges of the graphite layers appear to be "glowing", more so in A) where the EG was compressed prior to being coated 110. The images in A) closely resemble the images of FIG. 5, where no surfactant was present. This indicates that compressing 115 prior to coating 110 does not do as well at infiltrating the pores of the graphite matrix as coating 110 prior to the compressing 115 (as shown in B)).

The amount of nucleating agent used in the filling 120 may expressed as a concentration in the solution with the PCM. The weight percent of nucleating agent to PCM may be in the range of about 0.1 wt % to about 5 wt %. In some embodiments, the weight percent of nucleating agent in the solution may be less than 3 wt %. The remaining weight percent may consist mostly of PCM.

The PCM may be eutectic, organic, or inorganic. Eutectic PCMs may be organic-organic, inorganic-organic, or inorganic-inorganic. Organic PCMs may be paraffin or non-paraffin compounds. Organic PCMs generally do not suffer from significant supercooling or phase separation. Inorganic PCMs may be salt hydrates or metallics. Salt hydrates are alloys of inorganic salts (AB) and water ($H_2O$) resulting in a typical crystalline solid of general formula ($AB.xH_2O$). Exemplary salt hydrates include calcium chloride hexahydrate ($CaCl_2).6H_2O$) (CCH), calcium bromide hexahydrate ($CaBr_2.6H_2O$), disodium phosphate dodecahydrate ($Na_2HPO_4.12H_2O$) (DHPD), disodium sulfate decahydrate ($Na_2SO_4.10H_2O$), zinc nitrate hexahydrate ($Zn(NO_3)_2.6H_2O$), magnesium chloride hexahydrate ($MgCl_2.6H_2O$), magnesium nitrate hexahydrate ($Mg(NO_3)_2.6H_2O$), and lithium nitrate trihydrate ($LiNO_3.3H_2O$).

Figure 14:
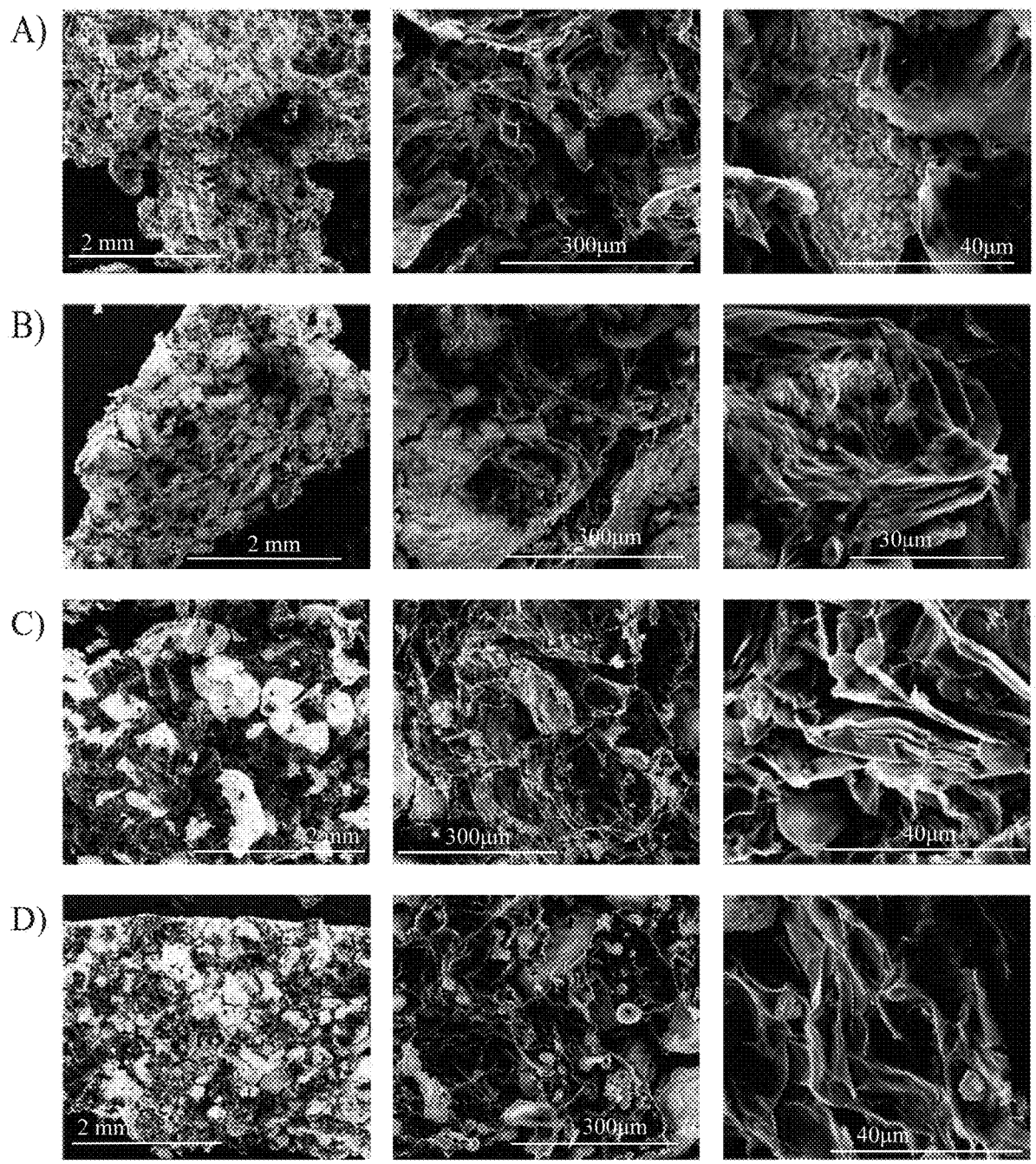
FIG. 14 illustrates SEM images of a graphite matrix substantially filled with A) a PCM of calcium chloride hexahydrate $(CaCl_2).6H_2O)$ (CCH) by soaking, B) a PCM of CCH by pre-compression vacuum filtration, C) a PCM of disodium phosphate dodecahydrate $(Na_2HPO_4.12H_2O)$ (DHPD) by soaking, and D) a PCM of DHPD by pre-compression vacuum filtration, according to some aspects of the present disclosure.

FIG. 14 illustrates SEM images of a graphite matrix substantially filled with A) a PCM of calcium chloride hexahydrate ($CaCl_2).6H_2O$) (CCH) by soaking, B) a PCM of CCH by pre-compression vacuum filtration, C) a PCM of disodium phosphate dodecahydrate ($Na_2HPO_4.12H_2O$) (DHPD) by soaking, and D) a PCM of DHPD by pre-compression vacuum filtration, according to some aspects of the present disclosure. Submerging the graphite matrix in the PCM with or without vacuuming show a coating of PCM throughout the pores and surfaces of the graphite matrix, indicating effective filling 120. The DHPD samples in C) and D) display some spherical crystals throughout the graphite matrix, most likely due to the particular crystal structure of DHPD when compared to the structure of CCH.

Figure 15:
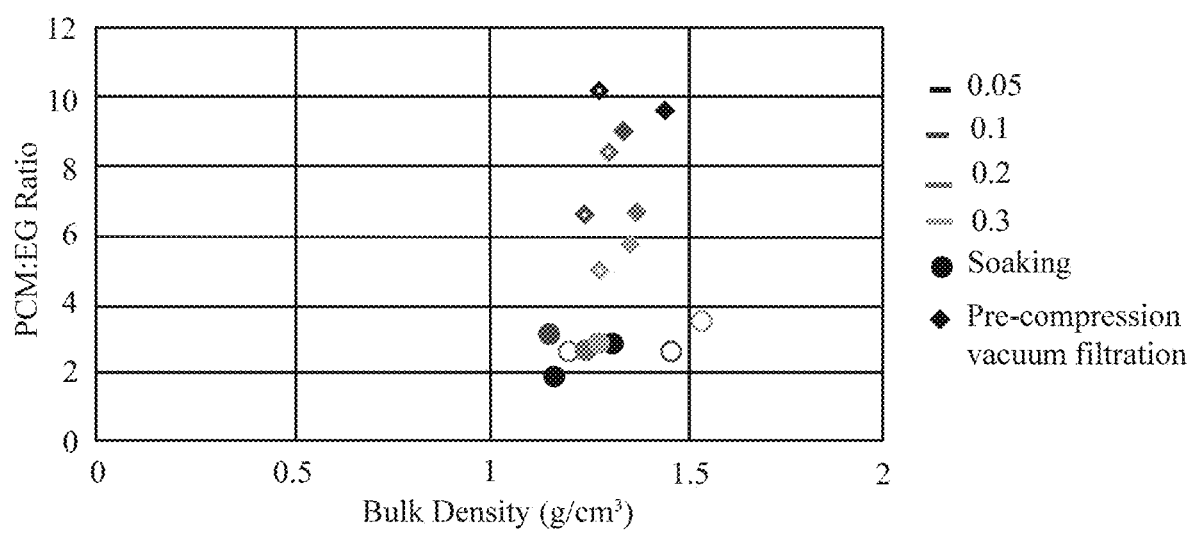
FIG. 15 illustrates the relationship between the PCM:EG mass ratio and the bulk density, according to some aspects of the present disclosure.

FIG. 15 illustrates the relationship between the PCM:EG mass ratio and the bulk density, according to some aspects of the present disclosure. Filled icons indicate a PCM of CCH, outlined icons indicate a PCM of DHPD. Bulk density was calculated using the volume of the disk and the final mass after filling 120, as shown below:

$$\rho = \frac{\text{final mass}}{\text{thickness} \times r^2 \times \pi}$$

Points with a higher bulk density and a higher PCM:EG mass ratio show more filling 120 of the graphite matrix by the PCM. Both higher bulk density and higher PCM:EG mass ratio indicate that there is a high amount of PCM present in the graphite matrix. As both soaking/submerging and pre-compression vacuum filtration (i.e., filling 120 using vacuum filtration prior to the compression 115) show comparable bulk density values, but the latter appears to consistently show a significantly higher PCM:EG mass ratio. This indicates that more PCM per mass of EG is present in the samples (all samples had the same mass of EG). Therefore, pre-compression vacuum filtration may be a more effective means of filling 120 than soaking/submerging.

Figure 16:
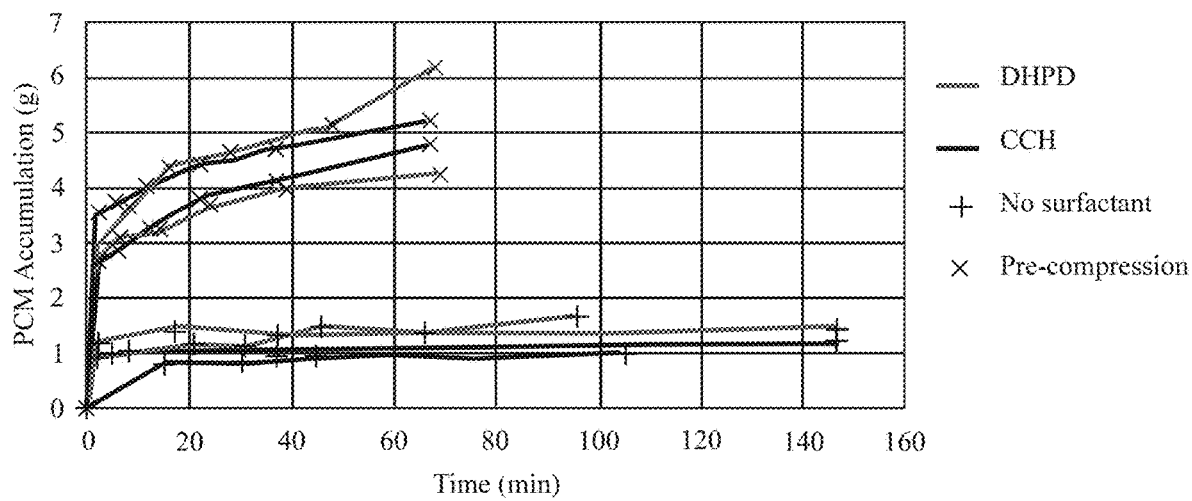
FIG. 16 illustrates the PCM accumulation within the graphite matrix over time, according to some aspects of the present disclosure.

FIG. 16 illustrates the PCM accumulation within the graphite matrix over time, according to some aspects of the present disclosure. As shown in FIG. 16, all of the samples approached their maximum saturation point after only 20 minutes, and pre-compression surfactant treatment of the EG clearly has a significant positive effect on PCM accumulation. Note that soaking time of pre-compression samples was minimized due to the disk losing structural integrity as it becomes more saturated with PCM. The saturation trends shown for these samples indicate that at the time the soaking a been stopped, there was probably more empty pores to be filled; however, such results were not obtained due to the disks falling apart after only about an hour of soaking.

Figure 17:
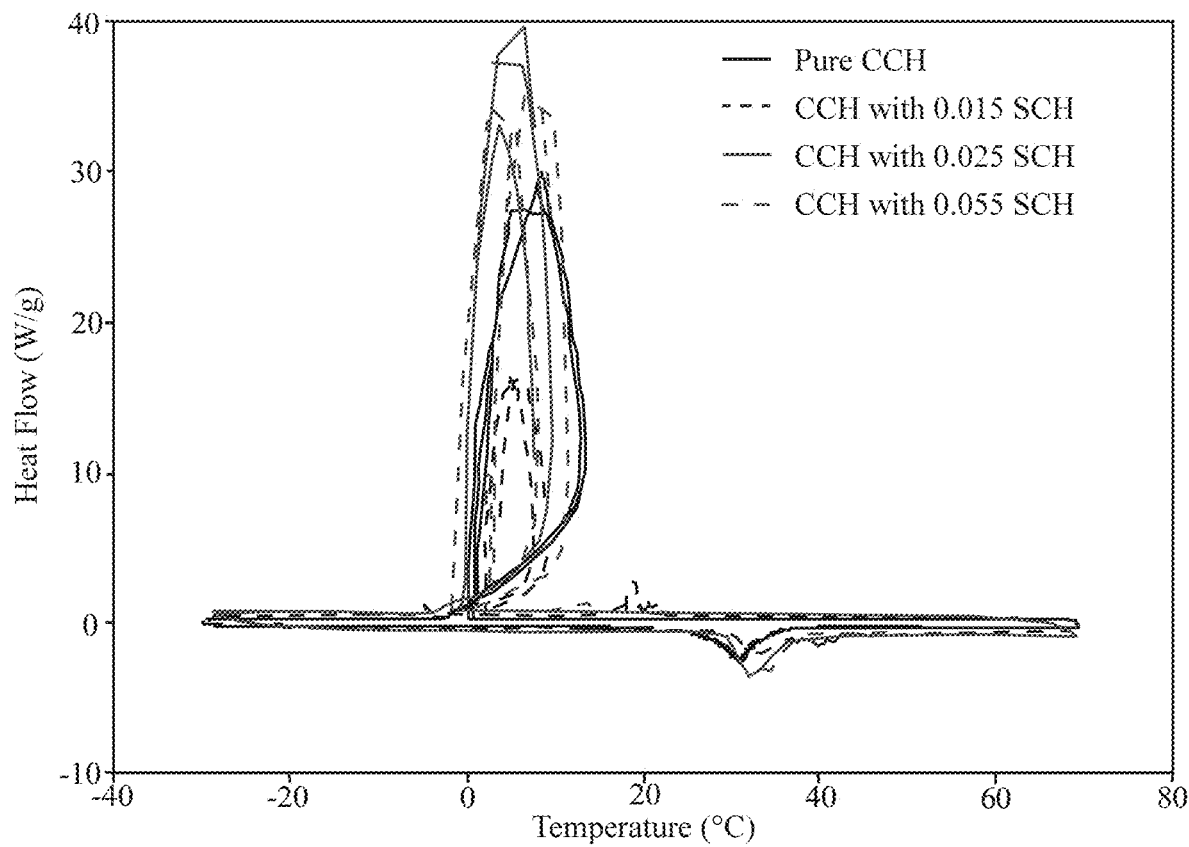
FIG. 17 illustrates the relationship between heat flow and temperature for a mixture of PCM of CCH and 1, 2, and 5% of a nucleating agent of strontium chloride hexahydrate $(SrCl_2.6H_2O)$ (SCH) (subjected to 4 cycles), according to some aspects of the present disclosure.

FIG. 17 illustrates the relationship between heat flow and temperature for a mixture of PCM of CCH and 1, 2, and 5% SCH (subjected to four cycles), according to some aspects of the present disclosure. Note that due to the small sample size and sensitivity of the instrument, differential scanning calorimeter (DSC) data often exaggerates supercooling; however, all samples showed comparable and consistent melting curves.

Table 1 shows average values for heat of fusion, heat of freezing, melting temperature, and freezing temperature for the samples in FIG. 17 over four cycles. Any given PCM composite has lower enthalpy values than pure PCM due to the presence of graphite (in the form of the graphite matrix) in the sample. Note that 5.0% SCH shows the best combination of retained enthalpy values and improved supercooling compared to the pure CCH sample: it has neither the highest enthalpy values nor largest reduction in supercooling of all samples, but when considering both factors jointly, 5.0 wt % SCH shows the most ideal compromise.

Table 1 shows average values for heat of fusion, heat of freezing, melting temperature, and freezing temperature for the samples in FIG. 17 over four cycles.

| Sample | Average Heat of Fusion (J/g) | Average Heat of Freezing (J/g) | Average Melting Temperature (° C.) | Average Freezing Temperature (° C.) |
|---|---|---|---|---|
| Pure CCH | 162.7 | 159.92 | 27.25 | 0.67 |
| CCH w/1.0 wt % SCH | 134.63 | 64.95 | 29.54 | 2.30 |
| CCH w/2.0 wt % SCH | 164.63 | 127.03 | 29.30 | 0.74 |
| CCH w/5.0 wt % SCH | 161.6 | 107.47 | 29.85 | 1.61 |

Figure 18:
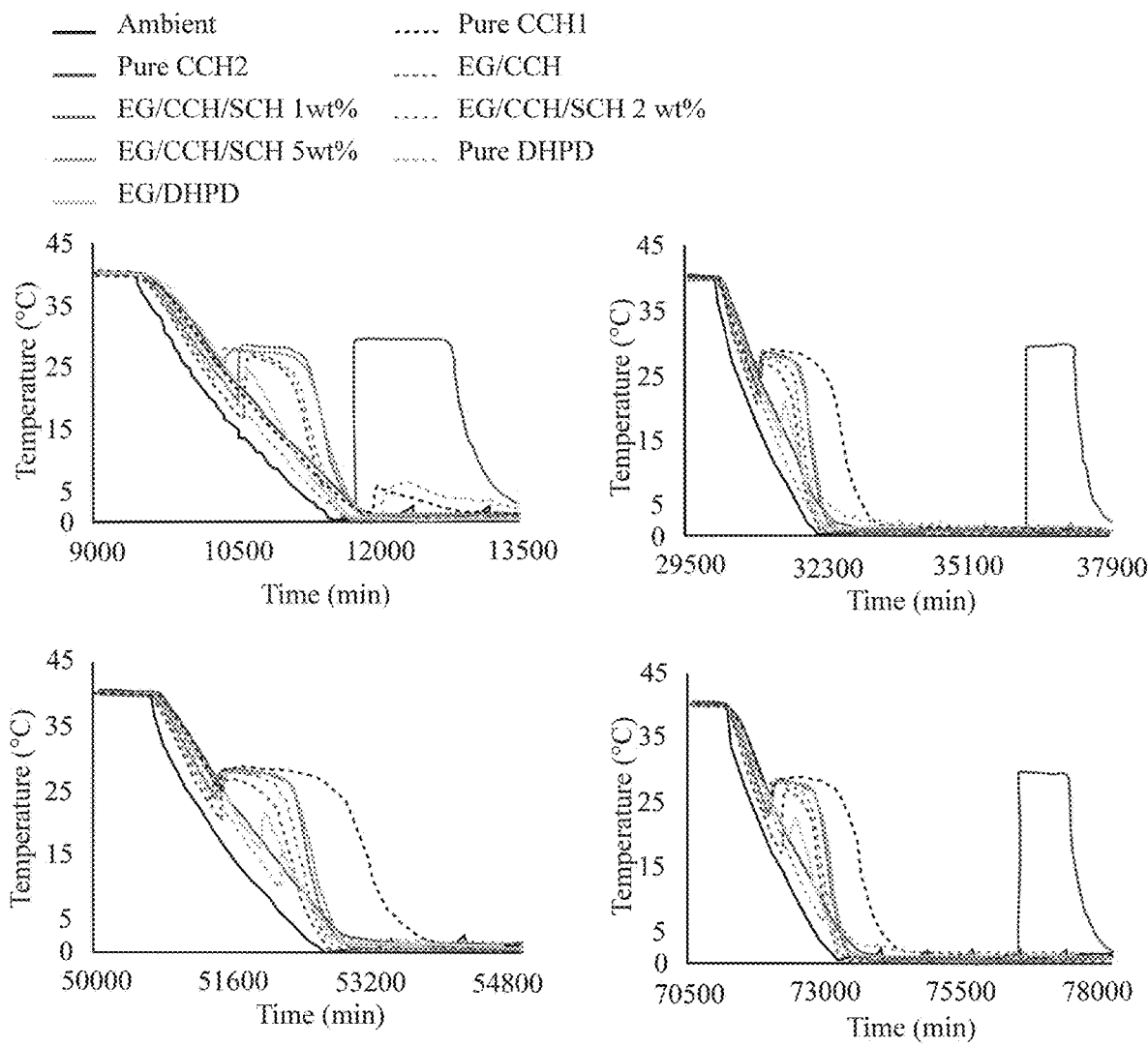
FIG. 18 illustrates cooling curves of pure PCM and graphite matrices filled with PCM, over four cycles, according to some aspects of the present disclosure.

Based on the temperature-history results shown in FIG. 18, the addition of EG improves supercooling for both CCH and DHPD. Additionally, the presence of SCH in CCH samples also significantly improves supercooling; these results are highlighted in FIG. 19, which similar data as FIG. 18 but with selected CCH samples only. Table 2 summarizes the nucleation and phase change temperatures of samples in FIG. 19, indicating the degree of supercooling in each sample. In general, supercooling was reduced from 30° C. in the pure CCH sample to about 3° C. in the EG/CCH/SCH 5.0 wt %.

FIG. 18 illustrates cooling curves of pure PCM and graphite matrices filled with PCM, over four cycles, according to some aspects of the present disclosure. The four examples shown in FIG. 18 show cooling curves of pure PCM, CCH with varying concentrations of SCH filled into EG, and DHPD filled into EG. The negative peaks in the cooling curves depict the degree of supercooling in each sample. Note that in cycle 3 (bottom left of FIG. 18) the pure CCH never freezes: this illuminates the randomness and unpredictability of nucleation.

Figure 19:
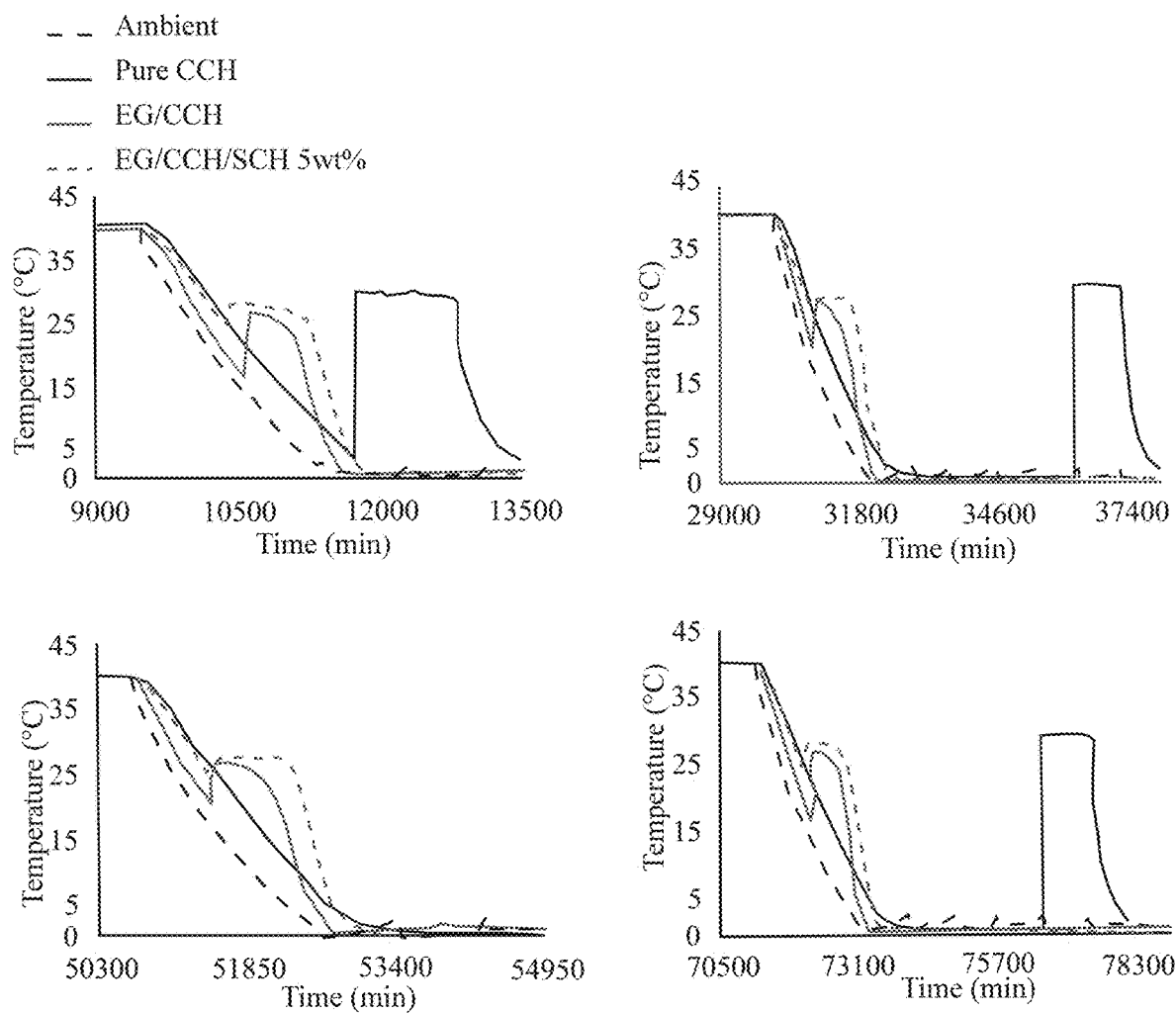
FIG. 19 illustrates cooling curves of pure PCM and PCM composites over four cycles, according to some aspects of the present disclosure.
Figure 20:
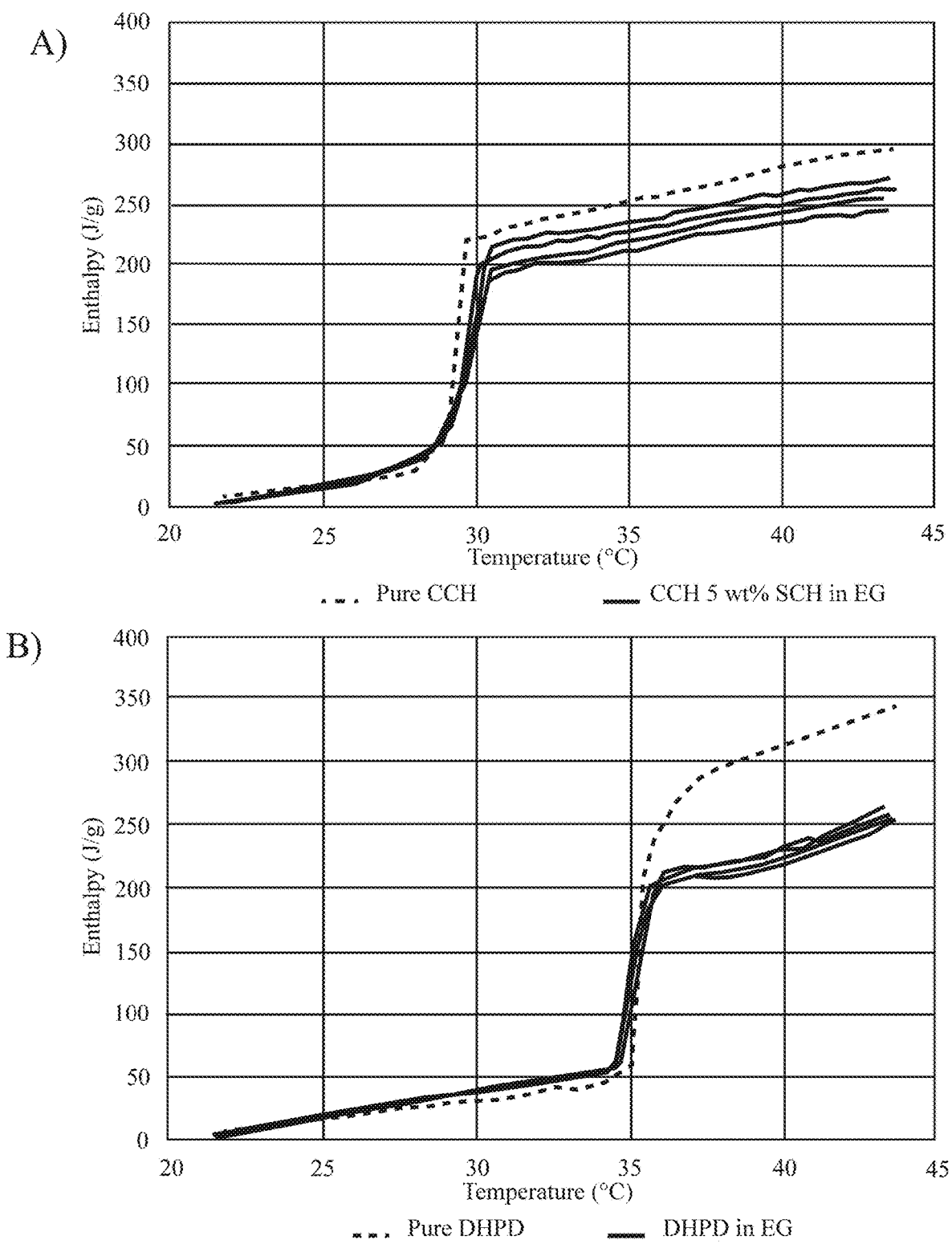
FIG. 20 illustrates enthalpy compared with temperature for A) a PCM of CCH, and B) a PCM of DHPD, according to some aspects of the present disclosure.

FIG. 19 illustrates cooling curves of pure PCM and PCM composites over four cycled, according to some aspects of the present disclosure. The cooling curves shown in FIG. 19 are the same as the cooling curves as shown in FIG. 18, but with only pure CCH, CCH filled into EG, and CCH with 5 wt % SCH filled into EG to highlight the effectiveness of both methods in nucleation. While EG itself significantly improves supercooling FIG. 20 illustrates enthalpy vs temperature curves for PCMs of A) CCH and B) DHPD for several cycles. The presence of EG in the samples (solid lines) does not significantly reduce the amount of latent heat, especially in the case of CCH. Table 2 shows the nucleation temperatures and phase change temperatures for three types of the samples shown in FIG. 20 over four cycles. Nucleation temperature corresponds to the negative peak in the cooling curve, and the phase change temperature corresponds to the horizontal plateau in each respective sample. Pure CCH cycle 3 has no values because that sample did not crystalize during this cycle.

TABLE 2

Nucleation and Phase Change Temperatures for Samples.

| Sample | Cycle | Nucleation Temperature (° C.) | Phase Change Temperature (° C.) |
|---|---|---|---|
| Pure CCH | 1 | 2.58 | 29.48 |
| | 2 | 0 | 29.32 |
| | 3 | — | — |
| | 4 | 0 | 29.44 |
| EG/CCH | 1 | 16.78 | 26.62 |
| | 2 | 20.68 | 26.37 |
| | 3 | 20.51 | 26.27 |
| | 4 | 17.12 | 26.45 |
| EG/CCH/SCH 5 wt % | 1 | 24.61 | 27.75 |
| | 2 | 24.92 | 27.74 |
| | 3 | 25.04 | 27.67 |
| | 4 | 24.87 | 27.75 |

Supercooling may occur when the PCM remains in the liquid phase when it is below its phase transition temperature (i.e., the temperature when it transitions from a liquid to a solid). A nucleating agent may reduce supercooling by providing a structure for the PCM to begin nucleation (i.e., encouraging the PCM to form a solid) when it is below its phase transition temperature. The phase transition temperature of the nucleating agent should be higher than the PCM so that the nucleating agent may remain substantially solid when the PCM is in the liquid state.

In some embodiments, the nucleating agent may have a substantially isomorphous lattice structure to the lattice structure of the PCM. That is, the lattice parameters of the nucleating agent may be within about 15% of the lattice parameters of the PCM. For example, calcium chloride hexahydrate ($CaCl_2$).$6H_2O$), a salt hydrate PCM has a hexagonal lattice structure and a melting point of approximately 30° C.; an appropriate nucleating agent for such a PCM may be strontium chloride hexahydrate ($SrCl_2$.$6H_2O$) which also has a hexagonal lattice structure and a melting point of approximately 115° C. Other exemplary nucleating agents which are substantially isomorphous to some salt hydrate PCMs include strontium bromide hexahydrate ($SrBr_2$.$6H_2O$), strontium iodide hexahydrate ($SrI_2$.$6H_2O$), barium iodide hexahydrate ($BaI_2$.$6H_2O$), barium chloride hexahydrate ($BaCl_2$.$6H_2O$), barium chloride ($BaCl_2$), barium bromide dihydrate ($BaBr_2$.$2H_2O$), barium bromide ($BaBr_2$), barium carbonate ($BaCO_3$), strontium carbonate ($SrCO_3$), barium fluoride ($BaF_2$), strontium fluoride ($SrF_2$), and barium hydrofluoride ($Ba(HF_2)$). For example, FIG. 11 shows a graphite matrix submerged in a mixture of melted calcium chloride hexahydrate ($CaCl_2$.$6H_2O$) (a salt hydrate PCM) and strontium chloride hexahydrate ($SrCl_2$.$6H_2O$) (a lattice-matched nucleating agent), according to some embodiments of the present disclosure. FIG. 12 illustrates a final PCM composite of a surface-treated compressed graphite matrix containing calcium chloride hexahydrate ($CaCl_2$.$6H_2O$) (a salt hydrate PCM) and strontium chloride hexahydrate ($SrCl_2$.$6H_2O$) (a lattice-matched nucleating agent), according to some embodiments of the present disclosure.

In some embodiments, the nucleating agent may have a substantially non-isomorphous lattice structure to the lattice structure of the PCM. That is, the lattice parameters of the nucleating agent may not be within about 15% of the lattice parameters of the PCM. Exemplary nucleating agents which are substantially non-isomorphous to some salt hydrate PCMs include barium oxide (BaO), barium hydroxide ($Ba(OH)_2$), barium sulfate ($BaSO_4$), barium carbonate ($BaCO_3$), and strontium hydroxide ($Sr(OH)_2$).

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present disclosure, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

The invention claimed is:

1. A composition comprising:
   a graphite matrix comprising an expanded graphite having a plurality of pores defining a pore volume;
   a surfactant having a first end and a second end;
   a mixture comprising a phase change material of at least one of calcium chloride hexahydrate ($CaCl_2$.$6H_2O$), calcium bromide hexahydrate ($CaBr_2$.$6H_2O$), disodium sulfate decahydrate ($Na_2SO_4$.$10H_2O$), disodium phosphate dodecahydrate ($Na_2HPO_4$.$12H_2O$), zinc nitrate hexahydrate ($Zn(NO_3)_2$.$6H_2O$), magnesium chloride hexahydrate ($MgCl_2$.$6H_2O$), magnesium nitrate hexahydrate ($Mg(NO_3)_2$.$6H_2O$), or lithium nitrate trihydrate ($LiNO_3$.$3H_2O$), and a nucleating agent positioned within between about 40% and about 95% of the pore volume; wherein:
   the first end of the surfactant is bonded to the expanded graphite,
   the second end of the surfactant is bonded to the phase change material, the surfactant is present in a mass ratio of the surfactant to the expanded graphite between about 1:100 and about 5:100, and the nucleating agent is present in the mixture at a concentration between greater than zero weight percent (wt %) and less than about 6.0 wt %.

2. The composition of claim 1, wherein the pore volume is between about 60% and about 95% of a total volume of the graphite matrix as defined by the pore volume plus a volume of the expanded graphite present in the graphite matrix.

3. The composition of claim 1, wherein the surfactant comprises at least one of octyl phenol ethoxylate ($C_{14}H_{22}O(C_2H_4O)_n$ where n=9-10) (TX-100) or polyethylene glycol tert-octylphenyl ether ($C_{14}H_{22}O(C_2H_4O)_n$ where n=7-8) (TX-105).

4. The composition of claim 1, wherein the mixture further comprises a hydrogel comprising at least one of poly(acrylamide-co-acrylic acid) (PAAAM), poly(acrylamide-co-sodium acrylate), or alginate.

5. The composition of claim 1, wherein the nucleating agent comprises at least one of strontium chloride hexahydrate ($SrCl_2.6H_2O$), strontium bromide hexahydrate ($SrBr_2.6H_2O$), strontium iodide hexahydrate ($SrI_2.6H_2O$), barium iodide hexahydrate ($BaI_2.6H_2O$), barium chloride hexahydrate ($BaCl_2.6H_2O$), barium chloride ($BaCl_2$), barium carbonate ($BaCO_3$), strontium carbonate ($SrCO_3$), barium fluoride ($BaF_2$), strontium fluoride ($SrF_2$), barium hydrofluoride ($Ba(HF_2)$), barium oxide ($BaO$), barium hydroxide ($Ba(OH)_2$)), barium sulfate ($BaSO_4$), or strontium hydroxide ($Sr(OH)_2$).

6. A method comprising, in order:
heating an intercalated graphite to a temperature between about 200° C. and about 750° C. resulting in an expanded graphite;
coating the expanded graphite with a surfactant having a first end and a second end to form a wetted graphite;
compressing the wetted graphite to form a graphite matrix having a plurality of pores defining a pore volume; and
filling between about 40% and about 95% of the pore volume with a mixture comprising a phase change material of at least one of calcium chloride hexahydrate ($CaCl_2).6H_2O$), calcium bromide hexahydrate ($CaBr_2.6H_2O$), disodium sulfate decahydrate ($Na_2SO_4.10H_2O$), disodium phosphate dodecahydrate ($Na_2HPO_4.12H_2O$), zinc nitrate hexahydrate ($Zn(NO_3)_2.6H_2O$), magnesium chloride hexahydrate ($MgCl_2.6H_2O$), magnesium nitrate hexahydrate ($Mg(NO_3)_2.6H_2O$), or lithium nitrate trihydrate ($LiNO_3.3H_2O$), and a nucleating agent resulting in an energy storage material; wherein:
the surfactant is present in a mass ratio of the surfactant to the expanded graphite between about 1:100 and about 5:100,
the first end of the surfactant is bonded to the expanded graphite and the second end of the surfactant is bonded to the phase change material, and the nucleating agent is present in the mixture at a concentration between greater than zero wt % and less than about 6.0 wt %.

7. The method of claim 6, wherein the pore volume is between about 60% and about 95% of a total volume of the graphite matrix as defined by the pore volume plus a volume of the expanded graphite present in the graphite matrix.

8. The method of claim 6, wherein the heating comprises:
placing the intercalated graphite in a furnace for a period of time, wherein:
the furnace is operated at a temperature of between about 200° C. and 750° C.

9. The method of claim 8, wherein the period of time is between about one (1) minute and about ten (10) minutes.

10. The method of claim 6, wherein the coating comprises:
submerging the expanded graphite in a solution comprising the surfactant.

11. The method of claim 6, wherein the wherein the surfactant comprises at least one of octyl phenol ethoxylate ($C_{14}H_{22}O(C_2H_4O)_n$ where n=9-10) or polyethylene glycol tert-octylphenyl ether ($C_{14}H_{22}O(C_2H_4O)_n$ where n=7-8).

12. The method of claim 6, wherein the compressing comprises:
placing the wetted graphite in a hydraulic press having a pellet die; and
pressing the pellet die on the wetted graphite resulting in the graphite matrix.

13. The method of claim 6, wherein the filling comprises:
melting the phase change material and the nucleating agent to form the mixture; and
submerging the graphite matrix in the mixture resulting in a slurry.

14. The method of claim 13, wherein the filling further comprises:
performing vacuum filtration on the slurry during the submerging, resulting in the energy storage material.

15. The method of claim 6, wherein:
a hydrogel comprising at least one of poly(acrylamide-co-acrylic acid) (PAAAM), poly(acrylamide-co-sodium acrylate), or alginate is added to the mixture prior to the filling.

16. The method of claim 6, wherein the nucleating agent comprises at least one of strontium chloride hexahydrate ($SrCl_2.6H_2O$), strontium bromide hexahydrate ($SrBr_2.6H_2O$), strontium iodide hexahydrate ($SrI_2.6H_2O$), barium iodide hexahydrate ($BaI_2.6H_2O$), barium chloride hexahydrate ($BaCl_2.6H_2O$), barium chloride ($BaCl_2$), barium carbonate ($BaCO_3$), strontium carbonate ($SrCO_3$), barium fluoride ($BaF_2$), strontium fluoride ($SrF_2$), barium hydrofluoride ($Ba(HF_2)$), barium oxide ($BaO$), barium hydroxide ($Ba(OH)_2$)), barium sulfate ($BaSO_4$), or strontium hydroxide ($Sr(OH)_2$).

* * * * *